United States Patent [19]

Molof et al.

[11] Patent Number: 5,651,891

[45] Date of Patent: Jul. 29, 1997

[54] WASTEWATER TREATMENT PROCESS

[75] Inventors: Alan H. Molof, New City, N.Y.; Sungtai Kim, Seoul, Rep. of Korea

[73] Assignee: Polytechnic University, Brooklyn, N.Y.

[21] Appl. No.: 577,821

[22] Filed: Dec. 22, 1995

Related U.S. Application Data

[62] Division of Ser. No. 335,203, Nov. 7, 1994, which is a continuation of Ser. No. 909,027, Jul. 6, 1992, which is a continuation-in-part of Ser. No. 388,955, Aug. 2, 1989, Pat. No. 5,128,040.

[51] Int. Cl.$^6$ ...................................................... C02F 3/30
[52] U.S. Cl. .......................... 210/605; 210/624; 210/625; 210/630; 210/903; 210/906
[58] Field of Search ................................. 210/605, 624, 210/625, 630, 903, 906

[56] References Cited

U.S. PATENT DOCUMENTS

| | | | |
|---|---|---|---|
| 2,391,494 | 12/1945 | Walker | 210/617 |
| 2,517,792 | 8/1950 | Kraus | 210/630 |
| 3,220,706 | 11/1965 | Valdespino | 210/624 |
| 3,654,147 | 4/1972 | Levin et al. | 210/630 |
| 4,056,465 | 11/1977 | Spector | 210/605 |
| 4,488,967 | 12/1984 | Block et al. | 210/605 |
| 4,488,968 | 12/1984 | Hong et al. | 210/605 |
| 4,522,722 | 6/1985 | Nichols | 210/605 |
| 4,663,044 | 5/1987 | Goronszy | 210/610 |
| 4,664,804 | 5/1987 | Morper et al. | 210/624 |
| 4,725,357 | 2/1988 | Downing et al. | 210/611 |
| 4,874,519 | 10/1989 | Williamson | 210/605 |
| 4,915,840 | 4/1990 | Rozich | 210/605 |
| 4,999,111 | 3/1991 | Williamson | 210/605 |
| 5,022,993 | 6/1991 | Williamson | 210/605 |
| 5,078,884 | 1/1992 | Mulder . | |
| 5,098,572 | 3/1992 | Faup et al. | 210/625 |

(List continued on next page.)

FOREIGN PATENT DOCUMENTS

| | | |
|---|---|---|
| 0327184 | 8/1989 | European Pat. Off. . |
| 137919 | 10/1979 | Germany . |
| 53-89259 | 8/1978 | Japan . |

OTHER PUBLICATIONS

Norris, D. P., Parker, D. P., Daniels, M. L., and Owens, E. L. 1980. "Efficiencies of Advanced Waste Treatment Obtained With Upgraded Trickling Filters." Civil Engineering ASCE, 48:96–101.

Norris, D. P., Parker, D. P., Daniels, M. L., and Owens, E. L. 1982. "High Quality Trickling Filter Effluent without Tertiary Treatment." J. Wat. Poll. Cont. Fed., 54:1087–98.

(List continued on next page.)

Primary Examiner—Christopher Upton
Attorney, Agent, or Firm—Curtis Morris & Safford P. C.

[57] ABSTRACT

A wastewater treatment process having improved solids separation characteristics and reduced biochemical oxygen demand (BOD) in the purified wastewater comprising the steps of: passing wastewater containing suspended solids and biodegradable organic substances through a main aerobic biological oxidation zone; passing the effluent from said aerobic biological oxidation zone to an aerobic/mixing zone and therein mixing said effluent with effluent from the anoxic/anaerobic zone; passing the effluent from said aerobic/mixing zone to a settling zone and therein separating purified wastewater and sludge containing suspended solids; passing a portion of the sludge formed in the settling zone and volatile acids to an anoxic/anaerobic zone; and recycling an effective amount of the effluent from said anoxic/anaerobic zone to said aerobic/mixing zone.

In an alternative embodiment, a volatile acid is added to a zone to which no additional oxygen has been added that is in the flow path from the main aerobic biological oxidation zone or, alternatively, it may be added to the anoxic/anaerobic zone and the thus-treated effluent is passed to the aerobic/mixing zone wherein phosphate is removed from the effluent.

26 Claims, 21 Drawing Sheets

U.S. PATENT DOCUMENTS

| | | | |
|---|---|---|---|
| 5,182,021 | 1/1993 | Spector | 210/605 |
| 5,259,959 | 11/1993 | Mulder . | |
| 5,288,405 | 2/1994 | Lamb III | 210/605 |

OTHER PUBLICATIONS

Fedotoff, R. C. 1983. "The Trickling Filter Finds New Partner." Water Engineering & Management, Jun.:28.

Niku, S., et al. 1982. "Reliability and Stability of Trickling Filter Process." J. Wat. Poll. Cont. Fed., 54:129–34.

Forster, C. F. 1971. "Separation of Activated Sludge Using Natural and Synthetic Polymers." Water Pollution Control, 71:363–71.

Wilkinson, J. F. 1958. "The Extracellular Polysaccharides of Bacteria." Bacteriol. Rev., 22:46.

Tenny, M. W., and Stumm, W. 1965. "Chemical Flocculation of Microorganisms in Biological Waste Treatment." J. Wat. Poll. Cont. Fed., 37:1370–88.

Gulas, V., Bond. M., and L. Benefield 1979. "Use of Exocellular Polymers for Thickening and DeWatering Activated Sludge." J. Wat. Poll. Cont. Fed., 51:798–807.

Pavoni, J., Tenny, M., and Echelberger, Jr., W. 1972. "Bacterial Exocellular Polymers and Biological Flocculation." J. Wat. Poll. Cont. Fed., 44:414–31.

Friedman, B., et al. 1970. "Structure of Exocellular Polymers and their Relationships to Bacterial Flocculation." J. Bacteriol., 98:1328–88.

Kiff, R. J. 1978, "A study of the Factors Affecting Bioflocculation in the Activated Sludge Process." Water Pollution Control, 77:464–70.

Harris, R. H., and Mitchell, R. 1975. "Inhibition of the Bioflocculation of Bacteria by Biopolymers." Water Research, 9:993–99.

Symons, J., McKinney, R., and Hassis, H. 1960. "A procedure for Determination of the Biological Treatability of Industrial Wastes." J. Wat. Poll. Cont. Fed., 32:841–52.

Weng, C., and Molof, A. H. 1974. "Nitrification in the Biological Fixed–Film Rotating Disk System." J. Wat. Poll. Cont. Fed., 46:1676.

Geher, R., and Henry, J. G. 1983. "Removal of Extracellular Materials: Techniques and Pitfalls." Water Research, 17:1743–48.

Novak, J. E., and Haugan, B. E. 1981. "Polymer Extraction from Activated Sludge." J. Wat. Poll. Cont. Fed., 53:1420–24.1

Brown, M. J., and Lester, J. N. 1980. "Comparison of Extracellular Polymer Extraction Methods." Appl. & Environ. Microbiol., 40:179–86.

Osborn, D. W., "Sewage Purification in South Africa—Past and Present", ISSN 0378–4738—Water SA vol. No. 3. Jul. 1988.

Eckenfelder, W. Wesley, Jr., "Biological Phosphorous Removal: State of the Art Review, Pollution Engineering" 88–93 (Sep., 1987).

Barnard, James L., "Activated Primary Tanks for Phosphate Removal", Water SA, 10, No. 3, 121–126 (Jul., 1984).

Air Products and Chemical, Inc. Brochure entitled "Environmental Products Update", 2 pages (Jan. 1988).

Single page from Air Products and Chemicals, Inc. brochure commencing "Reviewing the features of the UCT process . . . " (date unknown).

Dagger et al. . . . Journal WPCF 60, No. 10, p. 1834, (date unknown).

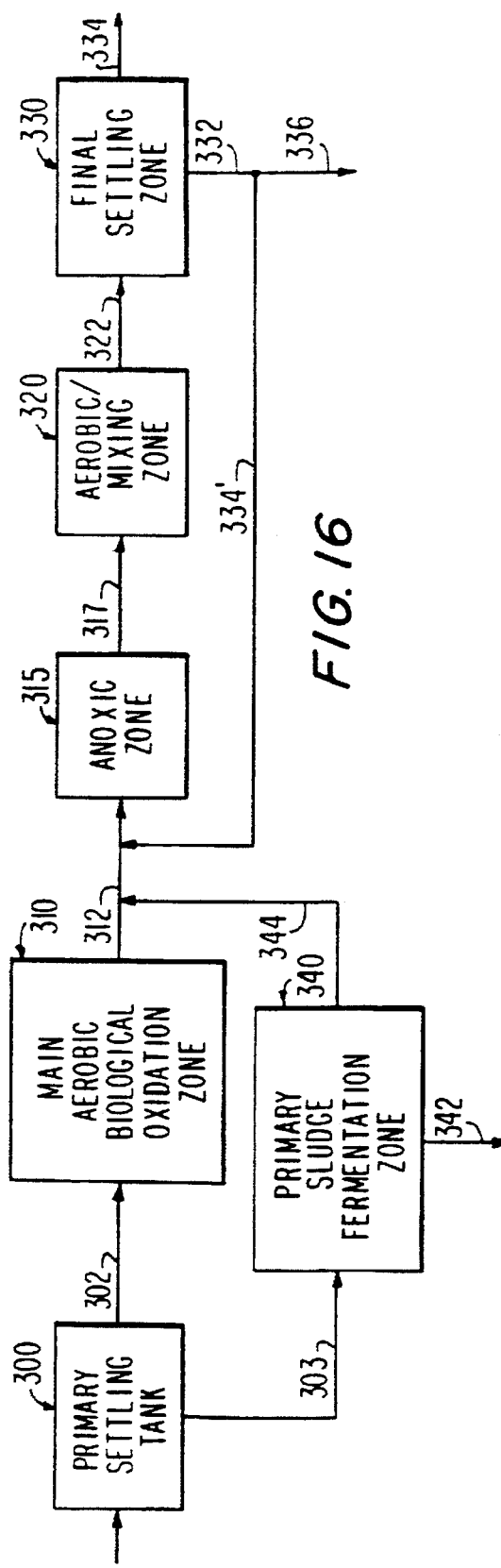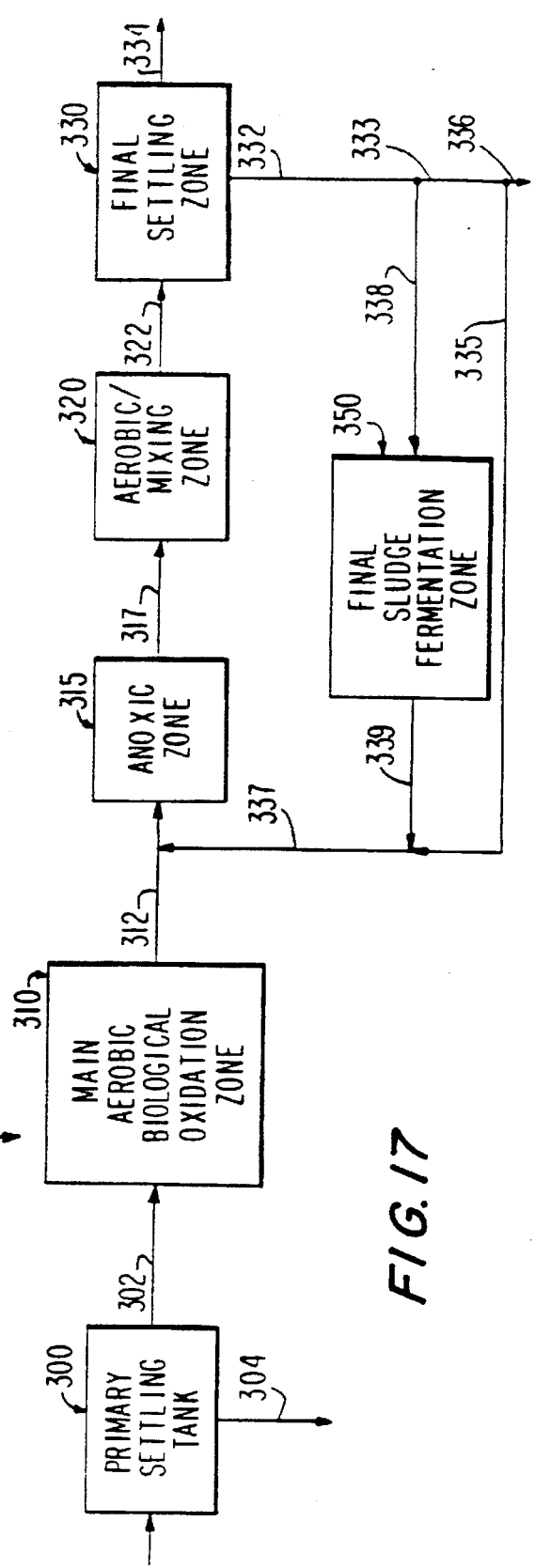

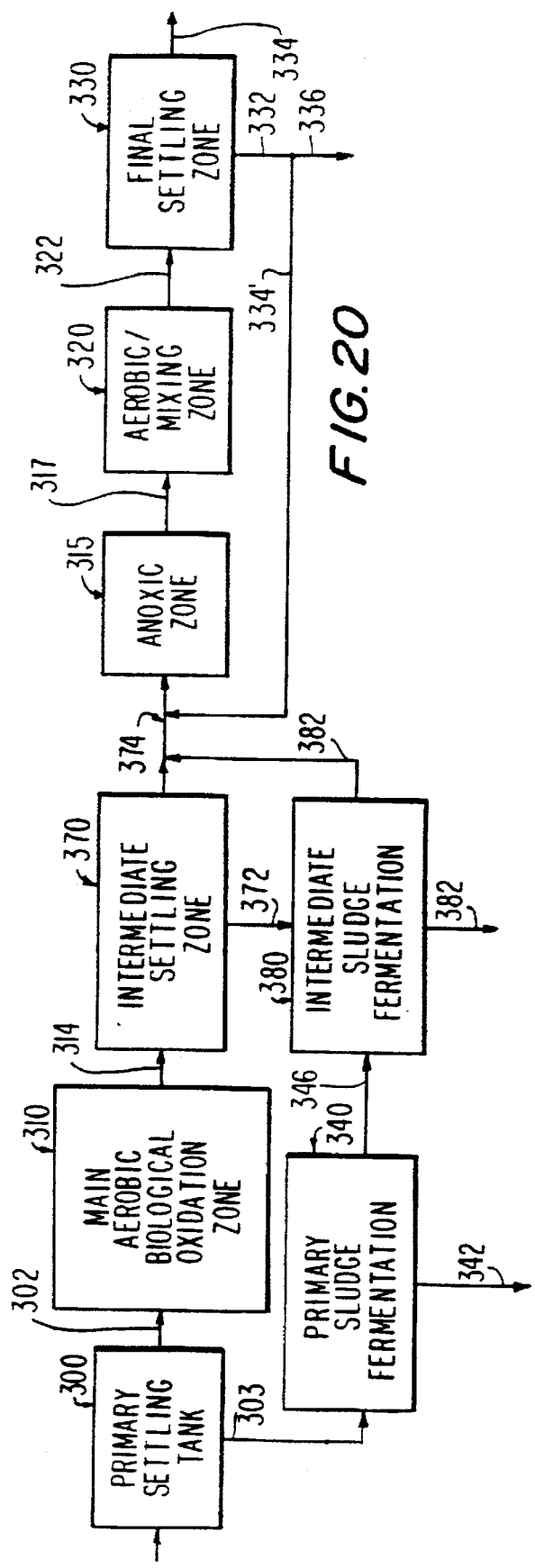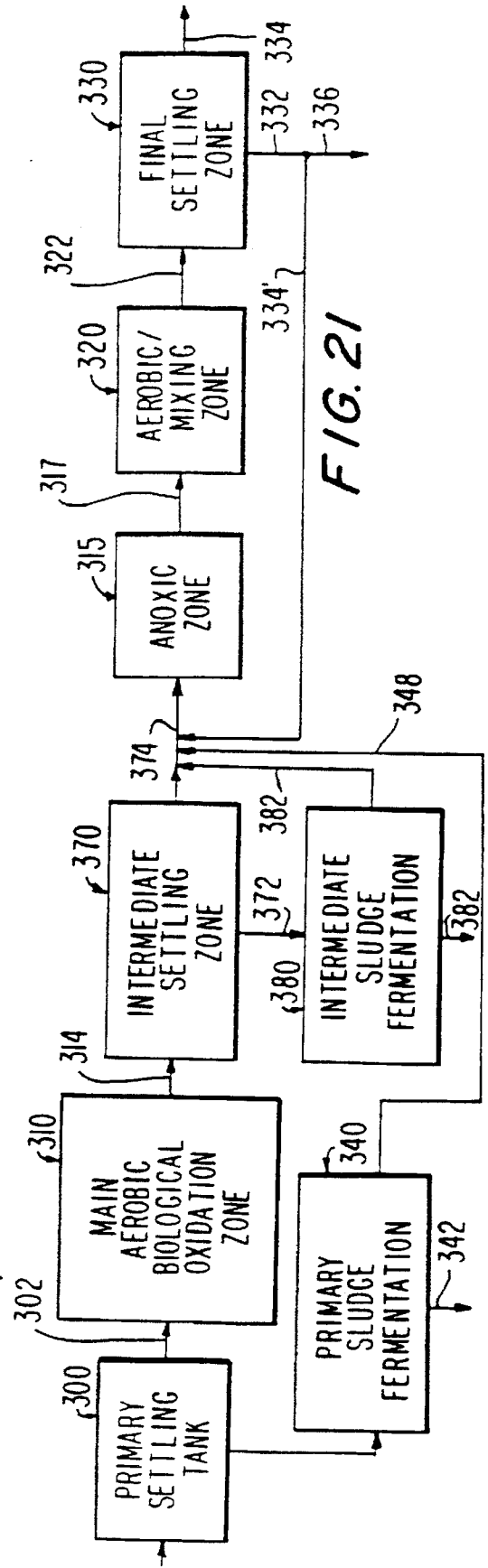

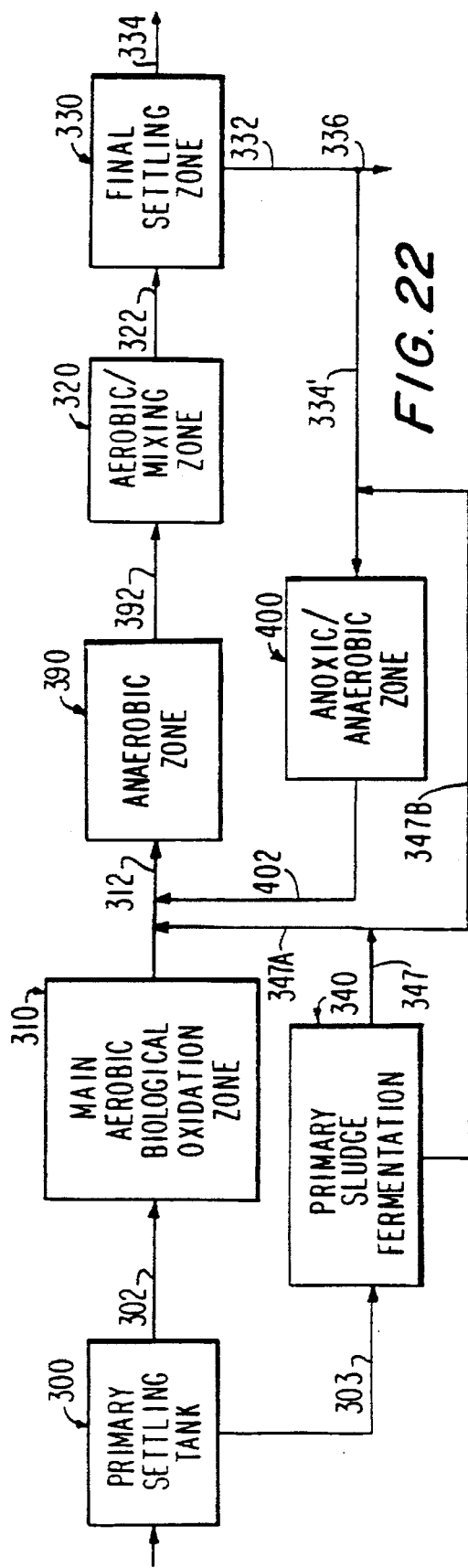
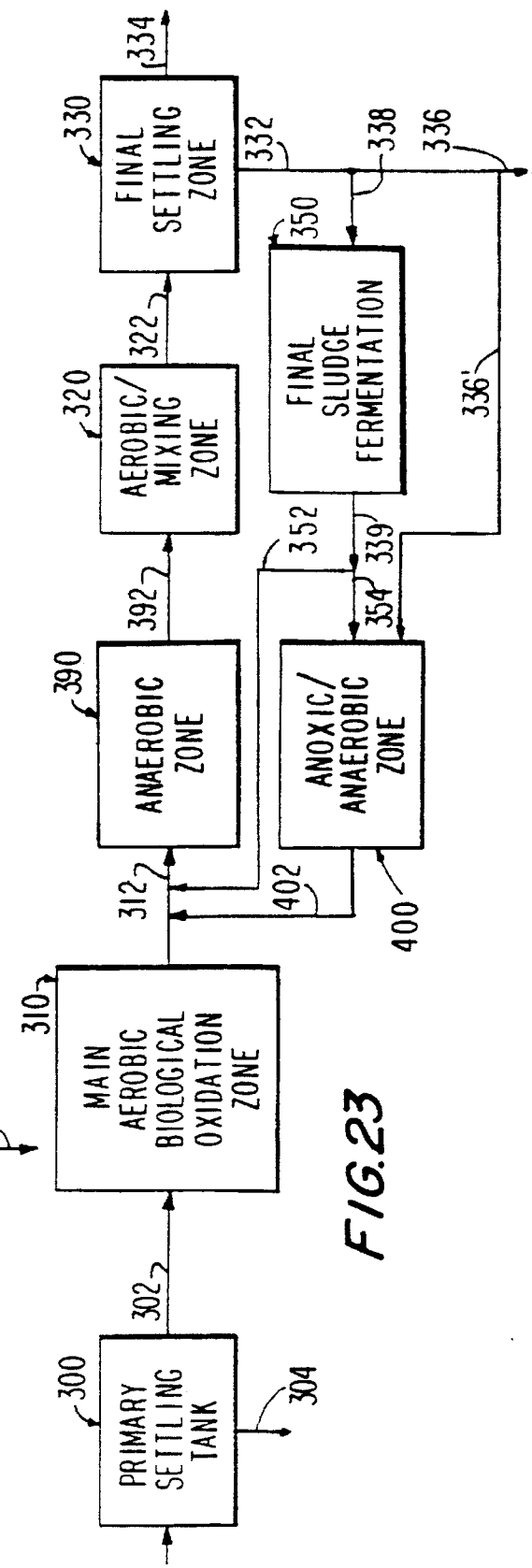
FIG. 22
FIG. 23

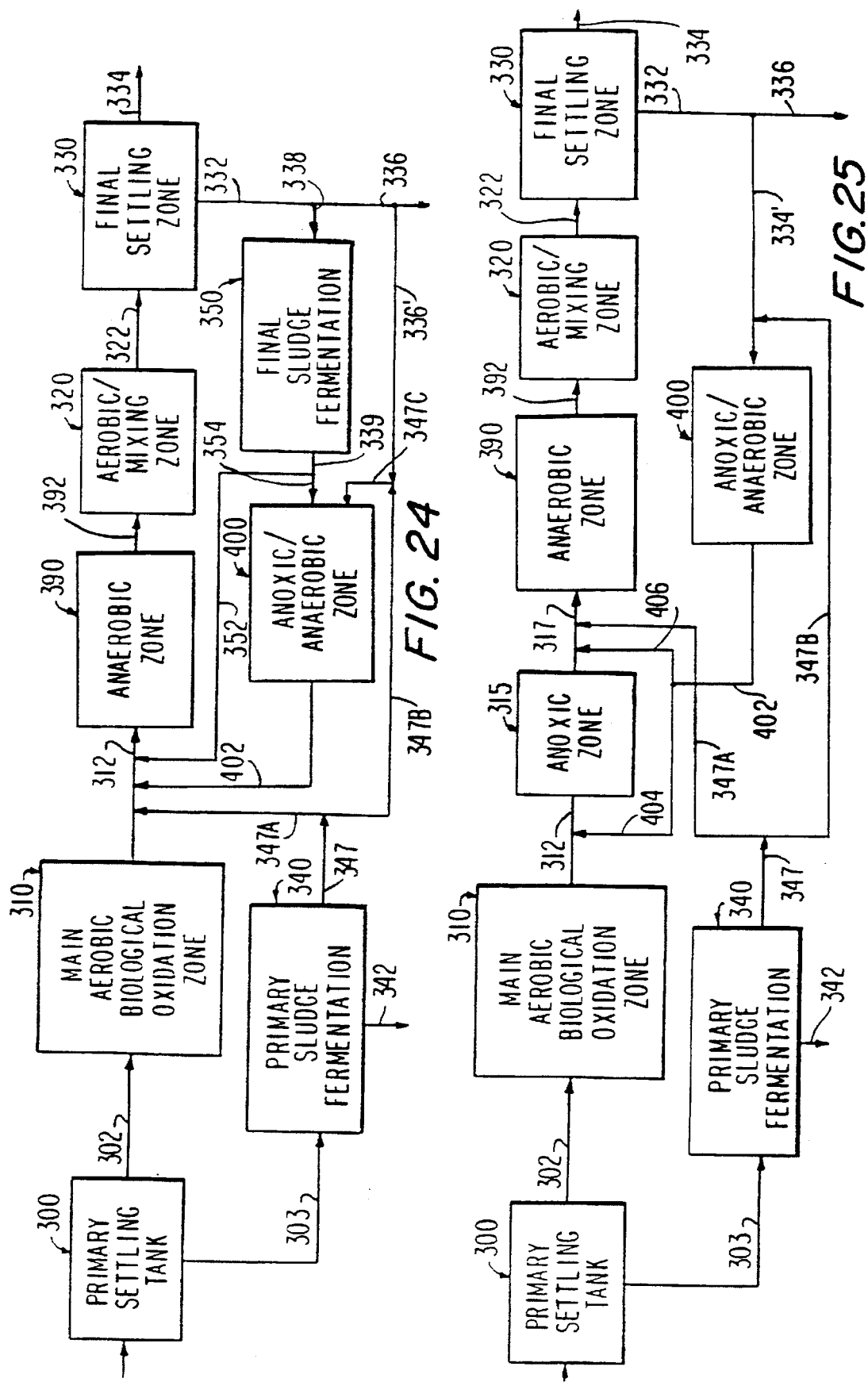

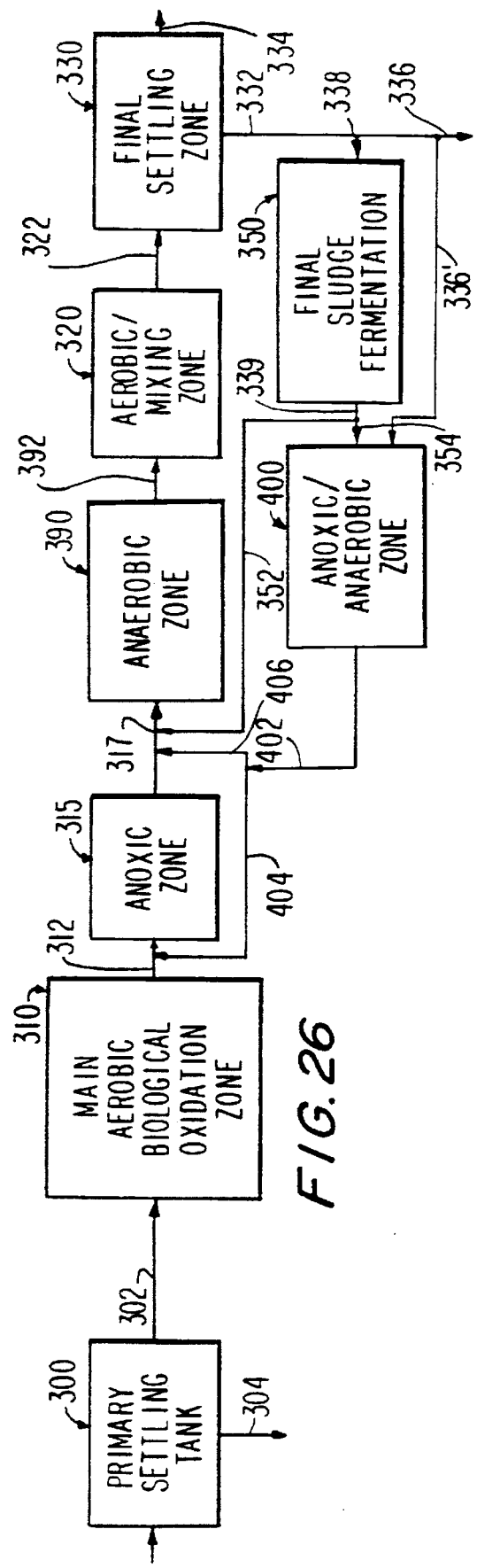
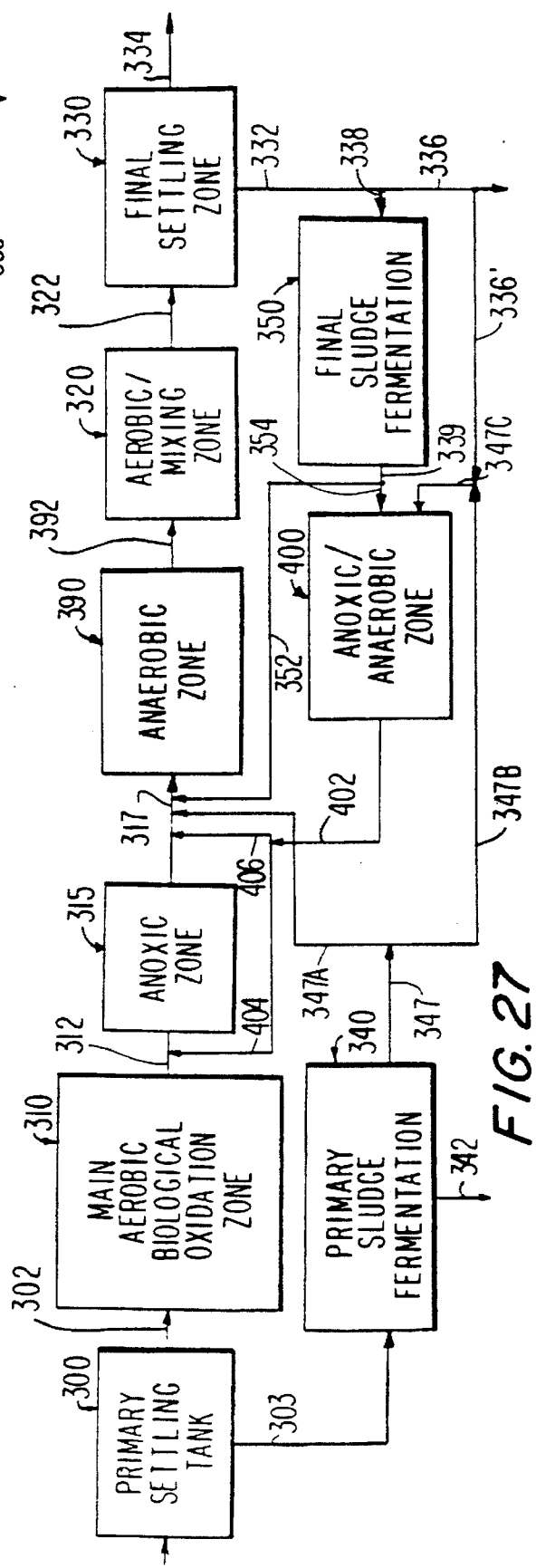
FIG. 26
FIG. 27

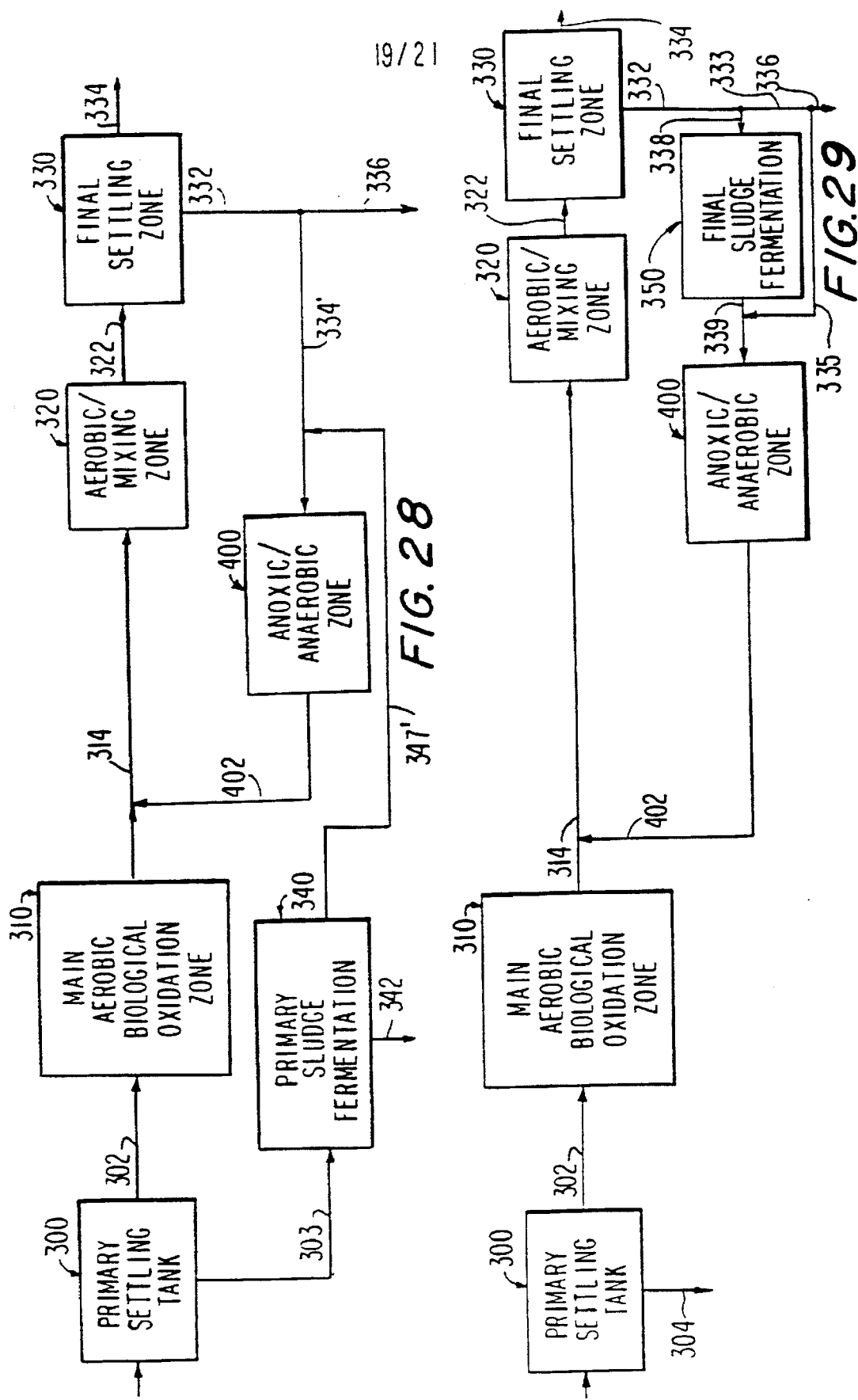

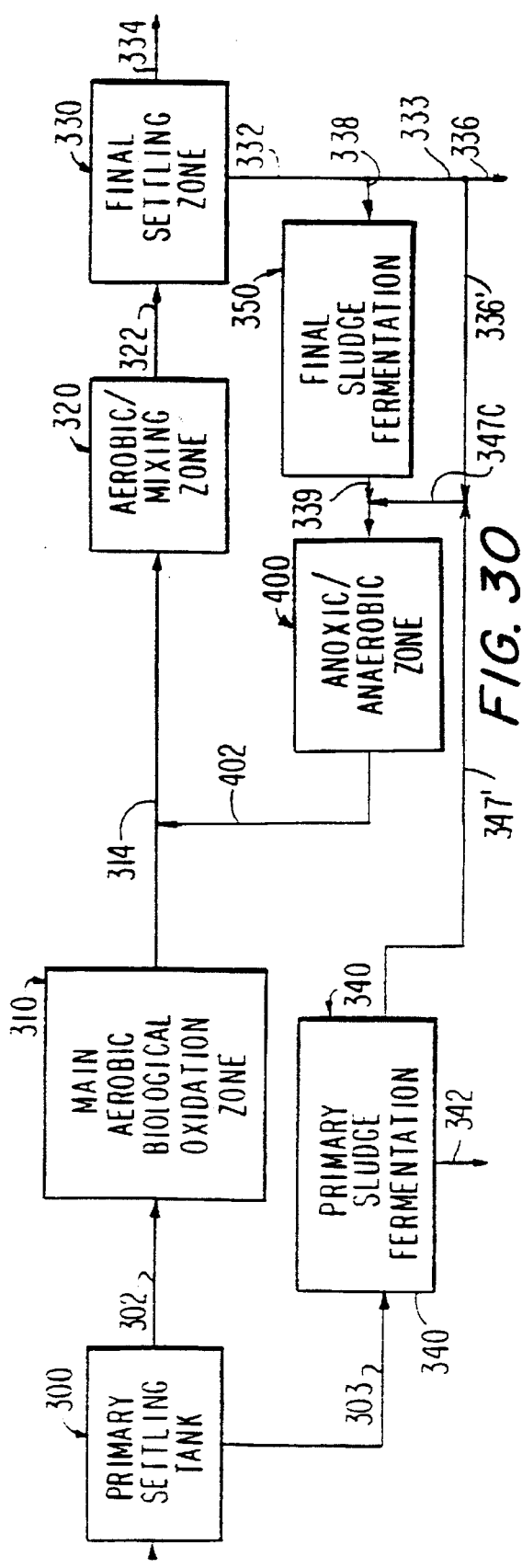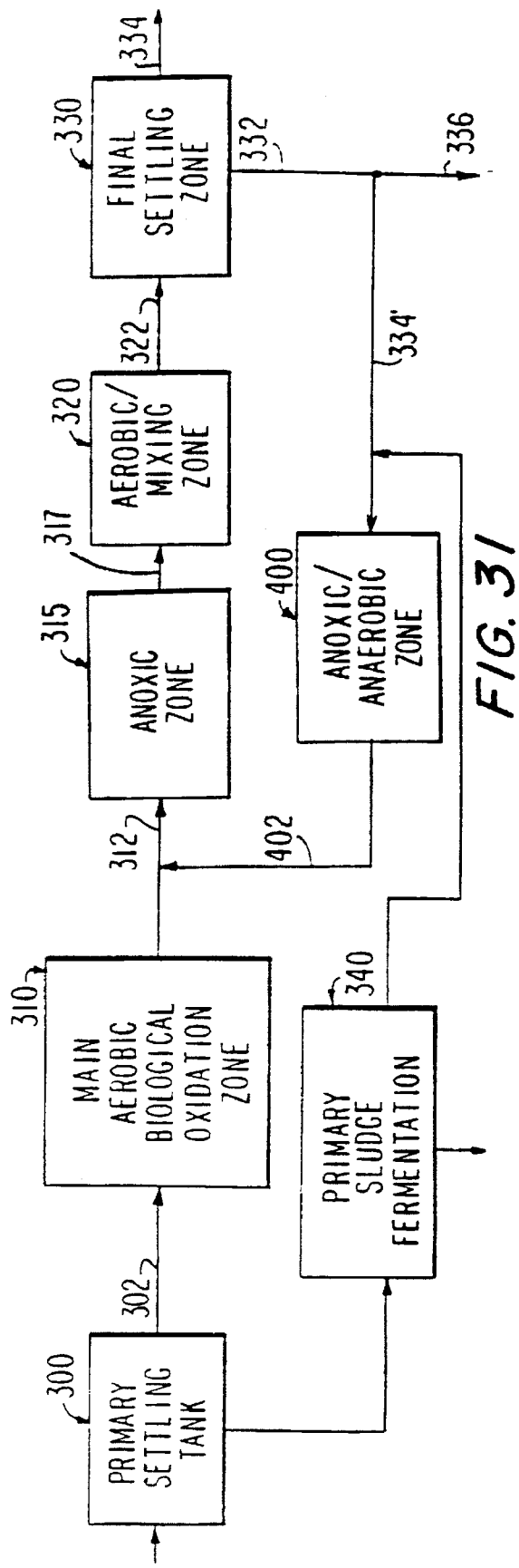

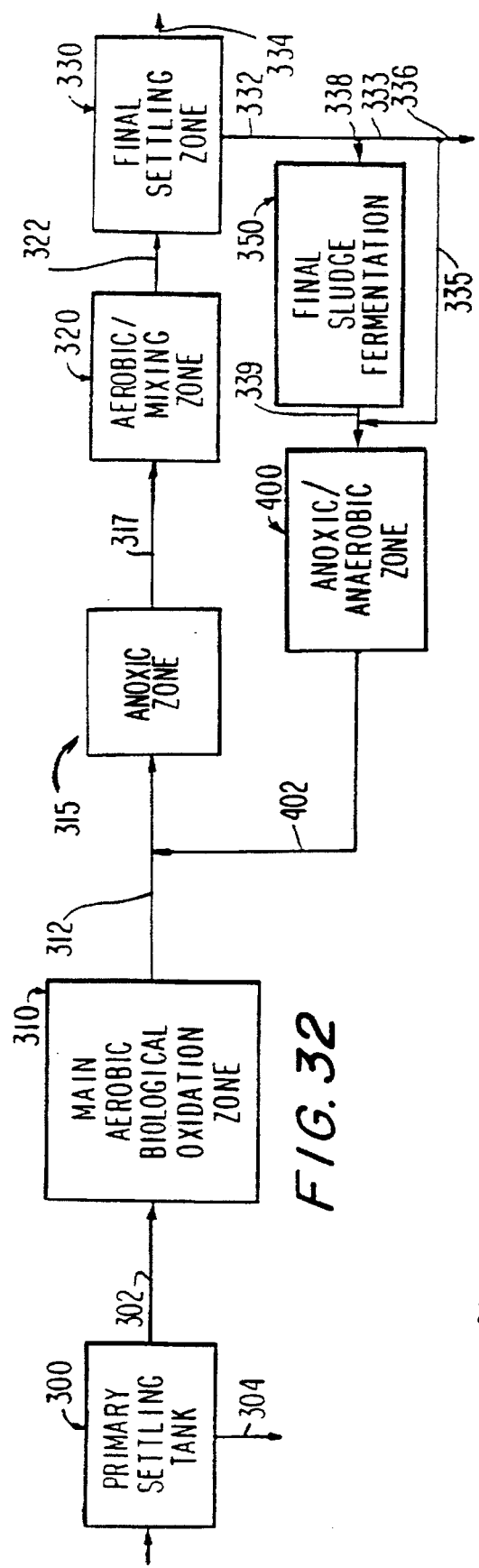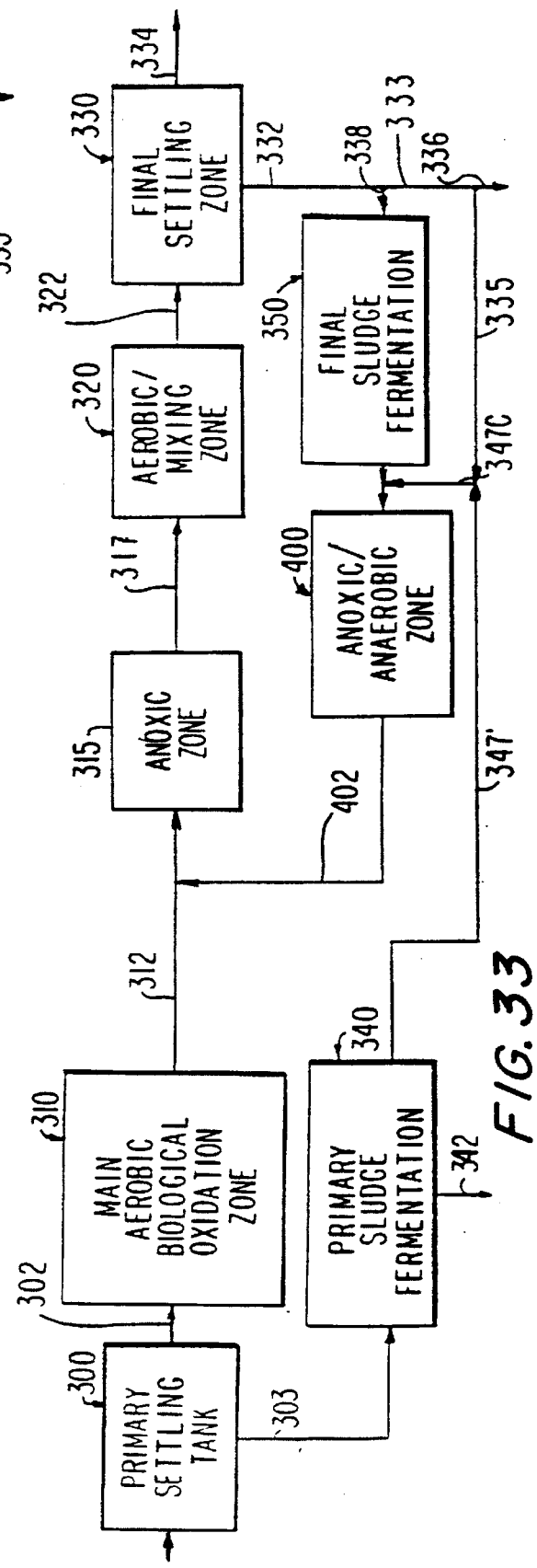

WASTEWATER TREATMENT PROCESS

CROSS-REFERENCE TO RELATED APPLICATION

This application is a division of application Ser. No. 08/335,203, filed on Nov. 7, 1994, which is a continuation of Ser. No. 07/909,027, filed on Jul. 6, 1992, which is a continuation-in-part of U.S. patent applicant Ser. No. 07/388,955, filed Aug. 2, 1989, now U.S. Pat. No. 5,128,040.

FIELD OF THE INVENTION

This invention relates broadly to process improvements in trickling filter wastewater treatment processes. More specifically, this invention relates to methods for improving the efficiency of solids removal in trickling filter/solids contact processes. Yet more specifically, this invention relates to the conduct of such processes in order to substantially improve the efficiency of the removal of suspended solids and the reduction of biochemical oxygen demand in existing processes. In addition, it provides the opportunity to decrease the nitrogen and phosphorus levels of wastewater.

BACKGROUND OF THE INVENTION

Trickling filter wastewater processes include the step of passing wastewater in a downward flow system in contact with biomass attached to a filter medium. A sufficient contact time between the wastewater and the filter medium is provided for the absorption of soluble and colloidal material into the biomass. As a result of the oxidation or oxidative respiration step, new biomass is created. In addition, the biomass is reduced by endogenous respiration.

Trickling filter wastewater treatment processes are easy to operate and maintain, and are considered energy efficient relative to activated sludge processes because they do not need an expensive air supply. However, effluent quality is not consistently high, typically containing 20 to 40 mg/l of biochemical oxygen demand (BOD) and suspended solids (SS).

Although trickling filters were the most frequently used secondary wastewater treatment process until the 1940's, the application of trickling filters has gradually decreased in recent years due to an inability to meet a 30 day-30 mg/l $BOD_5$ and SS standard. This is mainly due to a high effluent SS. In order to provide a high quality effluent, efficient removal of solids from the trickling filter effluent is necessary.

Many process modifications have been used to improve the performance of trickling filters. One such alternative is to replace the trickling filter with the activated sludge process or a rotating biological contactor (RBC). A second alternative is to use a tertiary treatment process such as filtration or chemical treatment to polish the effluent of existing trickling filter plants. A third alternative is to replace the existing trickling rock media with plastic media to enhance the performance of the trickling filter. A fourth alternative is to modify the trickling filter process with a coupled activated sludge process. Each of these alternative measures can provide the means to meet the current secondary effluent discharge limitation of 30 mg/l of $BOD_5$ and SS, but each is associated with additional capital and operating costs.

In the early 1980's, Norris et al. [1,2] and Fedotoff [3] suggested a simple process modification for the trickling filter process to produce a high quality effluent without requiring expensive tertiary or coupled treatment. In this modification, the trickling filter effluent is mixed with return sludge from the final settling tank and further treated in an aeration tank or channel with a short hydraulic retention time. The aerated solids contact sludge is then settled in the final settling tank. These modifications are generally referred to as the Trickling Filter/Solids Contact (TF/SC) process.

The advantages of the TF/SC process modifications of trickling filters according to Norris et al. [1,2], Fedotoff et al. [3], and Niku et al. [4], include: (1) lower capital cost than full scale activated sludge processes and the rotating biological contractors (RBC), (2) lower operating and maintenance costs, (3) simplicity of operation, (4) ease of biological sludge settling, (5) adaptability to existing trickling filters, and (6) equivalence of performance to the activated sludge process.

TF/SC plants have consistently produced an effluent quality which exceeds that of secondary treatment or comparable tertiary treatment plants. The production of high quality effluent is related to the enhanced flocculation and soluble organic removal property of the aerated solids contact sludge. However, the process kinetics and design parameters of the solids contact step are not fully understood.

As in other biological wastewater treatment processes, the efficiency of treatment attained by the trickling filter is greatly affected by the performance of the final settling tank. Most of the dissolved organic matter and colloidal solids in wastewaters applied to trickling filters are rendered settleable by adsorption and biological flocculation on the trickling filter biological film. The film itself is modified by decomposition and the net removal of solids in wastewater is varied and related to the biomass holding capacity in the filter. In spite of its importance, information on the sludge settling step in the trickling filter is extremely limited compared to that of the activated sludge process.

It is known that the flocculation of biological sludge is affected by various physical, electrochemical, and biochemical factors. The physical factors include the size of floc, degree of agitation in the system, surface area of floc, bound water, and solids concentration. The electrochemical factor includes the surface charge of flocs. The polymer content in the sludge represents the biochemical factor.

Although flocculation is closely related to the sludge settleability, there is no direct way to substantiate the degree of flocculation in the biological sludge. Sludge volume index (SVI), which represents the sludge settleability, is actually a measure of settled sludge volume as a result of the complex flocculation and compaction interaction during the settling process. Although the importance of polymeric material to sludge settleability has been recognized in the activated sludge process, study of the effect of polymeric material on sludge settleability in the trickling filter process has been limited.

OBJECTS OF THE INVENTION

It is thus a primary object of this invention to improve the efficiency of operation of trickling filter wastewater treatment processes.

It is a further and related object of this invention to improve Trickling Filter/Solids Contact processes.

It is still a further and related object of this invention to improve the sludge-settling step of trickling filter wastewater treatment processes by identification of process parameters and operating conditions so that higher quality effluent can be obtained.

It is still a further object of this invention to provide process modifications for existing trickling filter processes and existing Trickling Filter/Solids Contact processes which enable such plants to meet or exceed BOD and SS standards.

It is still a further object of this invention to provide process modifications for existing trickling filter processes and existing Trickling Filter/Solids Contact processes which enable such plants to meet or exceed nitrogen and phosphate standards and which provide the opportunity to decrease the nitrogen and phosphorus levels of wastewater.

BRIEF DESCRIPTION OF THE INVENTION

The invention is broadly in methods for increasing the settleability of suspended solids in the effluent of trickling filter processes including those wherein trickling filters are part of a solids contact process. Broadly, the invention is in the discovery that if a biological sludge obtained from the settling of suspended solids is retained in an anoxic/anaerobic zone for a period of time sufficient to increase the extracellular polymer contained therein, and thereafter is contacted with effluent from the trickling filter under mixing and aerobic conditions, settleability of suspended solids and reduction of biochemical oxygen demand (BOD) are substantially improved. It has also been found that nitrogen and/or phosphorous may be removed from the wastewater as well as improving the settleability of suspended solids and reducing BOD in purified wastewater by mixing the sludge from the anoxic/anaerobic zone with effluent from the trickling filter or activated sludge, or from an intermediate settling step, in an anoxic premixing zone and thereafter subjecting the mixed sludges to aerobic mixing conditions.

Further, it has been found that phosphorus removal can be facilitated by supplying volatile acid to a zone to which no additional oxygen has been added in the flow from the main aerobic biological oxidation zone, e.g., the trickling filter or to the anoxic/anaerobic zone and that nitrogen removal can be facilitated by the oxidation of ammonia nitrogen to nitrate nitrogen in the aerobic biological oxidation zone, e.g., trickling filter, and, optionally, by reduction of nitrate nitrogen to molecular nitrogen (nitrogen gas) in the zone to which no oxygen is added.

The invention provides great flexibility in the modification of existing trickling filter and trickling filter solids contact processes in that an anoxic/anaerobic zone can be installed for the processing of recycled sludge or intermediate sludge produced in the process, the sludge from the anoxic/anaerobic zone being mixed with effluent from the trickling filter or from an intermediate settlement step in the aerobic/mixing zone or in an anoxic premixing zone upstream of the aerobic/mixing zone. Further, a biological solids fermenter can be installed for the processing of either primary sludge or the intermediate sludge or final sludge produced in the process to produce volatile acid for phosphorus removal. The existing aerobic biological oxidation zone can be used for nitrogen nitrification and, optionally, the zone to which no additional oxygen has been added can be used for denitrification, or nitrogen removal. The process accordingly can be used in existing plants or new plants with substantial improvement of solids settleability, the reduction of BOD, and, by the inclusion of the anoxic premixing zone upstream of the aerobic/mixing zone and/or the inclusion of a volatile acid source, nitrogen and phosphorous values in the wastewater can be reduced.

BRIEF DESCRIPTION OF THE DRAWINGS

FIG. 16 is a schematic of a preferred process incorporating the invention.

FIGS. 17 through 27 are schematics of alternative embodiments of the preferred process of FIG. 16 incorporating the invention.

FIG. 28 is a schematic of a further preferred process incorporating the invention.

FIGS. 29 and 30 are schematics of an alternative embodiments of the preferred process of FIG. 28 incorporating the invention.

FIG. 31 is a schematic of another preferred process incorporating the invention.

FIGS. 32 and 33 are schematics of alternative embodiments of the preferred process of FIG. 31.

DETAILED DESCRIPTION OF THE INVENTION

Figure 1:
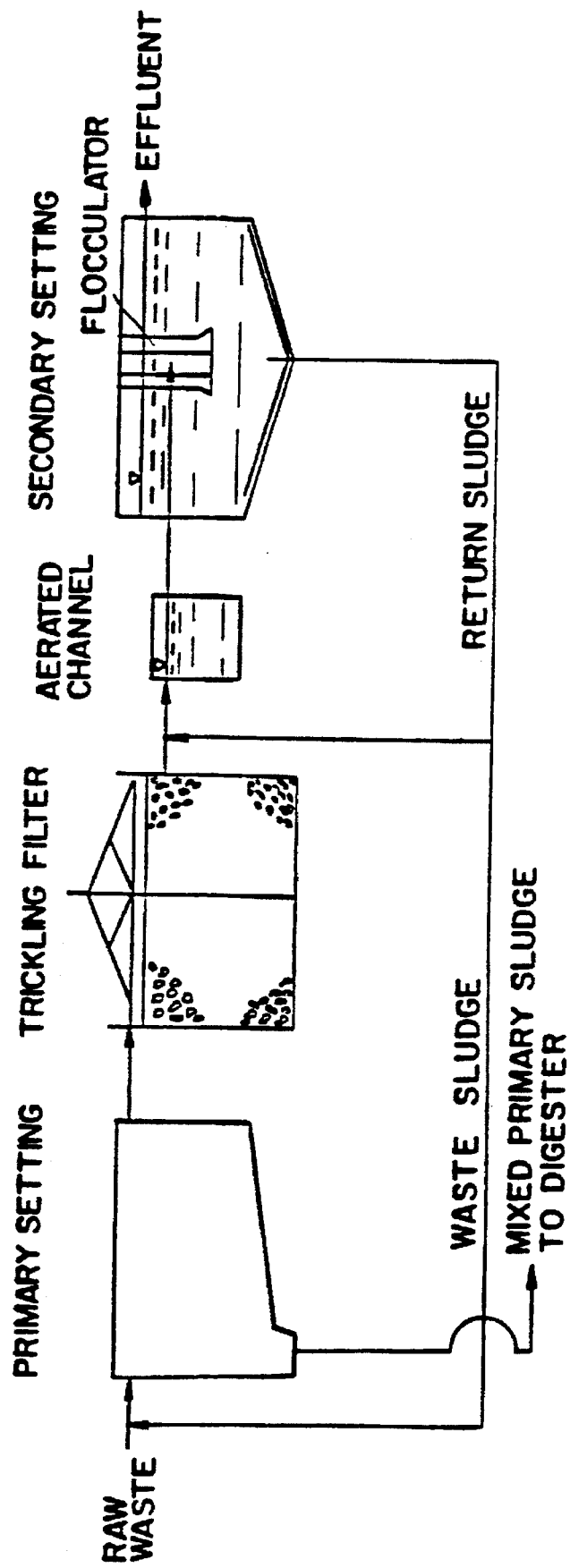
FIG. 1 is a schematic diagram of trickling filter/solids contact process.

The invention relates broadly to wastewater treatment processes and more specifically to such processes which employ trickling filters or trickling filters as part of a solids contact process. The invention can be used with domestic, agricultural and/or industrial wastewater. Certain types of industrial wastes are difficult to treat biologically because they lack certain nutrients, such as nitrogen and phosphorus. In order to biologically treat such wastes, nutrients, such as nitrogen and phosphorus, may be added to make up for their limited concentration or complete absence. The treatment of paper making wastes would be an example where available nitrogen and phosphorus are added for biological activated sludge treatment to maintain ratios of b 1part nitrogen per 20 parts BOD and 1 part phosphorus per 75 parts BOD. FIG. 1 sets forth a schematic diagram for such a trickling filter/solids contact process as is known in the art.

It has now been found, broadly, that the settleability of suspended solids in the effluent of such processes can be substantially improved and that the biochemical oxygen demand (BOD) in the purified wastewater can be substantially reduced in a process wherein sludge from said process is retained in an anoxic/anaerobic zone (as defined below) for a time sufficient to improve the settling characteristics of the suspended solids in the effluent of the process plant, and thereafter contacting the sludge from the anoxic/anaerobic zone with effluent from the trickling filter under mixing and aerobic conditions (as defined below).

It has also been found that nitrogen and/or phosphorus removal can be facilitated in accompaniment with the foregoing by a process wherein, with respect to phosphorus removal, volatile acid, such as from a biological solids fermenter (as defined below), is supplied to the anoxic/anaerobic zone and/or, with respect to nitrogen removal, the aerobic biological oxidation zone oxidizes ammonia nitrogen to nitrate nitrogen and, optionally, an anoxic zone (as defined below) reduces nitrate nitrogen to molecular nitrogen (nitrogen gas).

Figure 11:
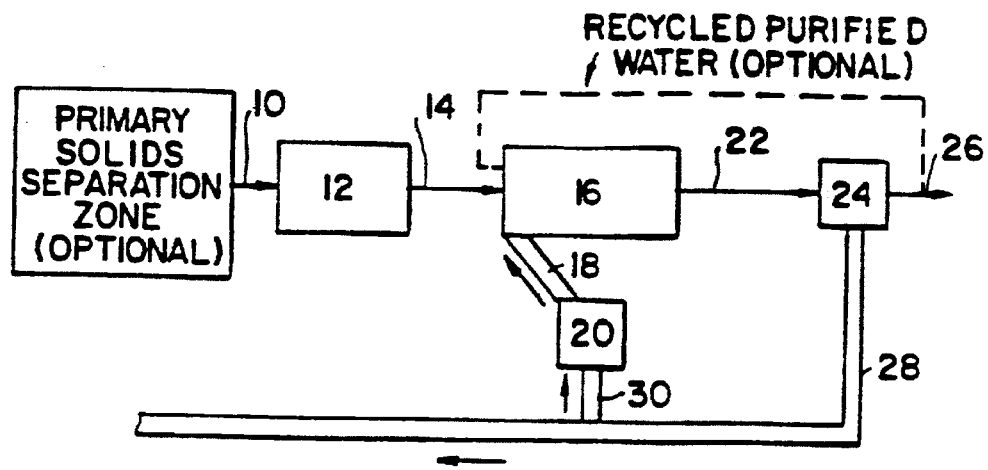
FIG. 11 is a schematic process diagram of a preferred process incorporating the invention.

In a preferred embodiment of the process, as depicted in FIG. 11, wastewater containing suspended solids and biodegradable organic substances is conveyed through line 10 through aerobic biological oxidation zone 12 wherein a portion of the BOD is converted into additional suspended solids. The effluent from aerobic biological oxidation zone 12 is passed via line 14 to aerobic/mixing zone 16 wherein it s mixed with effluent conveyed via line 18 from anoxic/anaerobic zone 20. Effluent from aeration mixing zone 16 passes via line 22 to settling zone 24. Purified wastewater having reduced BOD and suspended solids passes from settling zone 24 via line 26 and sludge, containing suspended solids, passes via line 28. The double lines in FIG. 11 and in FIGS. 12–15 indicate a sludge stream, while the single lines indicate a liquid stream. A portion of the sludge containing suspended solids is recycled via line 30 to anoxic/anaerobic zone 20. In anoxic/anaerobic zone 20, the extracellular polymer content of the sludge is increased and the effluent from zone 20 is recycled via line 18 to the aerobic/mixing zone as described above.

As used throughout, the following terms have the following meanings.

By "aerobic biological oxidation zone" is meant any of the known aerobic biological treatments such as trickling filter and trickling filter solids/contact operations as well as rotating biological filter operations or activated sludge processes. Such aerobic biological oxidation zones include any operation wherein the major thrust is the reduction of BOD by an aerobic biological treatment. Such treatments may include stabilization ponds, lagoons, and ditch oxidation steps.

By "aerobic conditions," i.e., the conditions in the aerobic/mixing zone, are meant aeration oxidation conditions as may be achieved in known process equipment including aerators, mixers, and the like. "Aerobic" means containing a finite amount of dissolved oxygen (DO). Preferred aerobic conditions are those wherein the DO is greater then one mg/liter.

By "anoxic conditions" are meant conditions in which no dissolved oxygen (DO) is present in the bulk liquid, but chemically bound oxygen, as in nitrate, is available to the microbial metabolism.

By "anaerobic conditions" are meant conditions wherein there is no DO in the bulk liquid and wherein nitrate also is absent so that only anaerobic microorganisms can survive.

By "anoxic/anaerobic conditions" are meant conditions which are at least anoxic, i.e., there is no dissolved (free) oxygen but there may or may not be combined oxygen present as nitrate.

The term "settling" as used herein refers broadly to any solids separation process known in the art, e.g., filtering and centrifuging.

The term "volatile acid" as used herein means water-soluble fatty acids that can be distilled at atmospheric pressure and includes water soluble fatty acids of up to 6 carbon atoms. It also includes the corresponding water-soluble carboxylates of the volatile acids.

The type of reactor used in any of the zones described in this invention (main aerobic biological oxidation zone, aerobic zone, anoxic zone, anoxic/anaerobic zone, and anaerobic zone) might be classified as biological slurry or fixed-film. In addition these two types can be combined as a slurry/fixed-film reactor. An example of the slurry reactor is the aeration tank as used in the activated sludge process. An example of a fixed-film reactor is a trickling filter or a rotating biological contactor (RBC). Combined slurry/fixed-film reactors can be of various types, including an RBC in an aeration tank, a slurry feed to a fixed-film reactor or a settled suspended biological solids feed to a fixed-film reactor.

In preferred embodiments of the process of FIG. 11, a portion of the purified wastewater may be separated in the settling zone and recycled to the aerobic/mixing zone as a diluent. In another preferred embodiment, the wastewater supplied to the aerobic biological oxidation zone may first be passed through a primary solids separation zone wherein a portion of the suspended solids and BOD is removed. The process conditions within the several treatment zones described in the process of FIG. 11 are set forth in detail before.

Broadly, the ratio of sludge recycled to the anoxic/anaerobic zone to sludge either removed from the process or recycled back to the aerobic biological oxidation zone is in the range of 1:99 to 99:1. Such a broad range imparts great flexibility to the process of the invention.

The ratio of the effluent from the anoxic/anaerobic zone to the effluent from the biological oxidation zone may vary over a broad range provided only that an effective amount of effluent from the anoxic/anaerobic zone is introduced into said aerobic/mixing zone in order to achieve the purposes of the invention.

Figure 12:
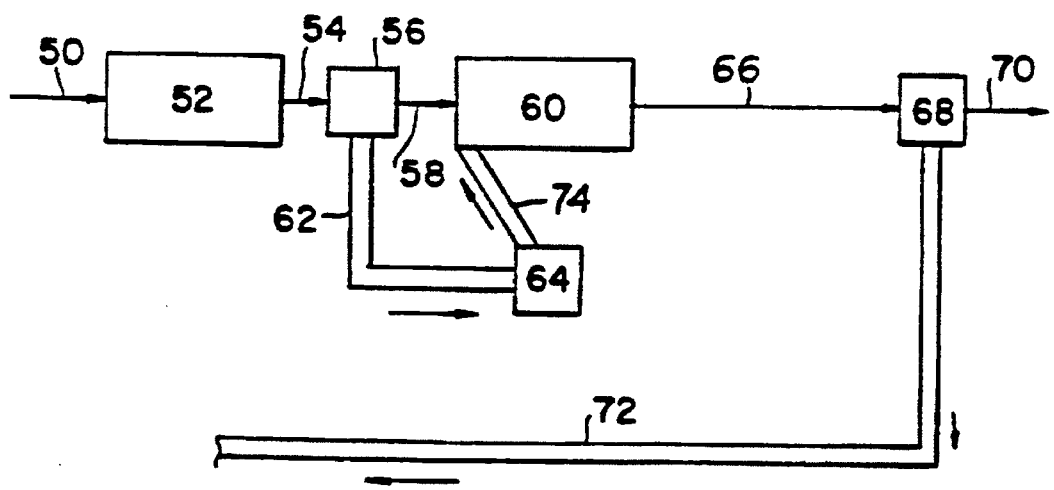
FIG. 12 is a second schematic process diagram of a preferred process incorporating the invention.

Another embodiment of the invention is depicted in FIG. 12. Reference numeral 50 refers to conduit through which wastewater containing suspended solids and biodegradable organic substances is conveyed to aerobic biological oxidation zone 52. In zone 52, a portion of the BOD is converted into additional suspended solids. The effluent from aerobic biological oxidation zone 52 is conveyed via conduit 54 to an intermediate settling zone 56 wherein an intermediate clarified effluent is separated from an intermediate sludge containing suspended solids. The clarified effluent passes via conduit 58 to aerobic/mixing zone 60 and the intermediate sludge is conveyed via conduit 62 to an anaerobic zone 64. The effluent from the aerobic/mixing zone 60 passes via conduit 66 to a secondary settling zone 68 wherein purified wastewater having reduced BOD and suspended solids is separated from sludge containing suspended solids. The purified wastewater is conveyed via conduit 70 from secondary settling zone 68 and the sludge containing suspended solids is removed recycled back to aerobic biological oxidation zone 52 via conduit 72. The intermediate sludge contained in anoxic/anaerobic zone 64 is retained therein for a time sufficient to increase the extracellular polymer content of said sludge, and the effluent from anoxic/anaerobic zone 64 containing an increased extracellular polymer is conveyed via conduit 74 to aerobic/mixing zone 60 wherein it is mixed with the intermediate clarified effluent conveyed via conduit 58. The process conditions within the several treatment zones described in the process of FIG. 12 are set forth in detail below.

Figure 13:
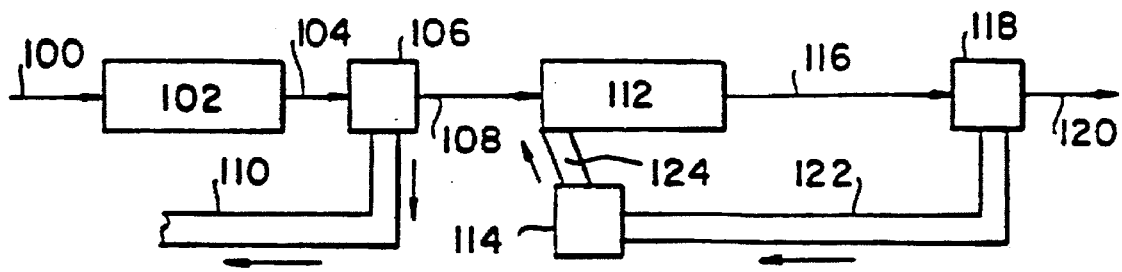
FIG. 13 is a third schematic process diagram of a preferred process incorporating the invention.

In FIG. 13, wastewater is introduced via conduit 100 to aerobic biological oxidation zone 102 wherein a portion of the BOD is converted into suspended solids. The effluent from zone 102 is conveyed via conduit 104 to intermediate settling zone 106, and intermediate clarified effluent is removed from zone 106 via conduit 108 and intermediate sludge containing suspended solids is removed or recycled back to aerobic biological oxidation zone 102 via conduit 110. The intermediate clarified effluent passes to aerobic/mixing zone 112 wherein it is mixed with effluent from anoxic/anaerobic zone 114. The effluent from aerobic/mixing zone 112 is conveyed via line 116 to a secondary settling zone 118. In that zone, purified wastewater having reduced BOD and suspended solids is separated from sludge containing suspended solids. The former is removed via conduit 120 and the latter is recycled to anoxic/anaerobic zone 114 via conduit 122. The sludge containing suspended solids which is introduced into anoxic/anaerobic zone 114 is retained therein for a time sufficient to increase the extracellular polymer content of the sludge and the sludge is thereafter recycled via conduit 124 to anoxic/anaerobic zone 112. The conditions within each of the several zones described in the process of FIG. 13 are further set forth below.

Figure 14:
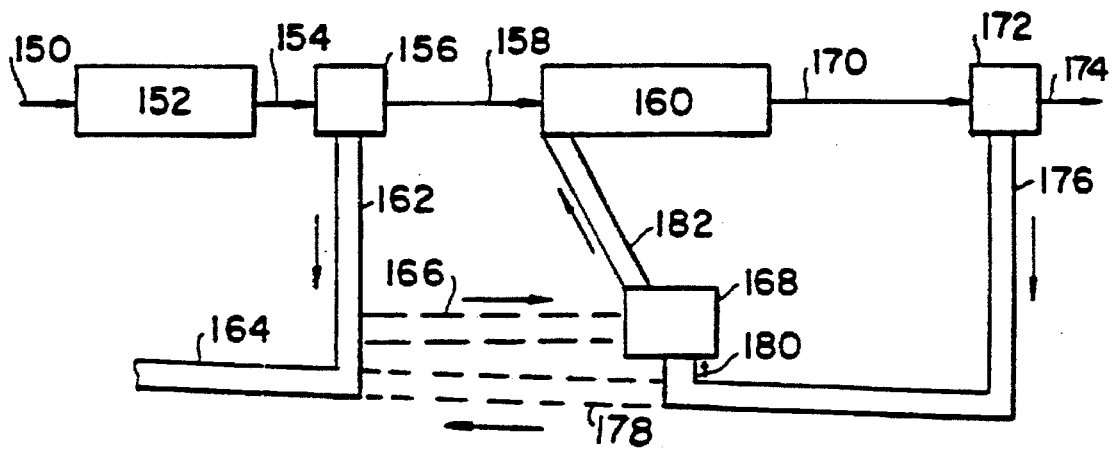
FIG. 14 is a fourth schematic process diagram of a preferred process incorporating the invention.

In FIG. 14, wastewater is introduced via conduit 150 to aerobic biological oxidation zone 152 wherein a portion of the BOD is converted into suspended solids. The effluent from zone 152 passes via conduit 154 to intermediate settling zone 156. An intermediate clarified effluent is conveyed from zone 156 via conduit 158 to aerobic/mixing zone 160. An intermediate sludge containing suspended solids is conveyed via conduit 162. The intermediate sludge (activated sludge) may be conveyed via conduit 164 to waste disposal or may be conveyed via conduit 166 to anoxic/anaerobic zone 168. The effluent of the aerobic/mixing zone 160 is conveyed via conduit 170 to secondary settling zone 172. In zone 172, a purified wastewater having reduced BOD and suspended solids is separated from a secondary sludge containing suspended solids. The former stream is conveyed from the process via conduit 174 and the latter stream is conveyed from secondary settling zone 172 via conduit 176. The secondary sludge may be removed from the process via conduits 176, 178 and 164 or may be recycled via conduit 180 to anoxic/anaerobic zone 168 wherein it may be mixed with intermediate sludge containing suspended solids conveyed via conduit 166. The sludge in anoxic/anaerobic zone 168 is retained therein for a time sufficient to increase the extracellular polymer content of such sludge and thereafter is recycled via conduit 182 to aerobic/mixing zone 160 wherein it is mixed with the intermediate clarified effluent in conduit 158. The conditions in the several zones described in FIG. 14 are further set forth below.

Figure 15:
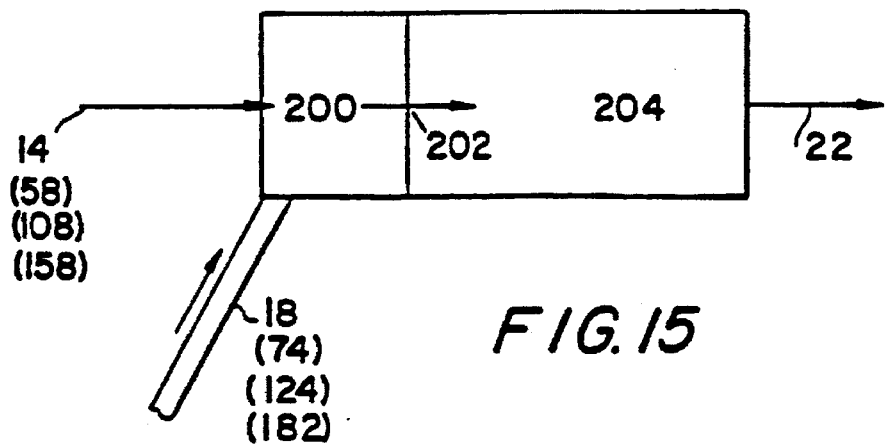
FIG. 15 is a schematic of a preferred process incorporating the invention.

It is a further and important aspect of the invention that the processes as described above can be further modified by establishing certain conditions in the mixing zone upstream of the aerobic/mixing zone. With reference to FIGS. 11 and 15, it has been found to be advantages to mix the effluent from the aerobic biological oxidation zone conveyed via conduit 14 with the effluent from the anoxic/anaerobic zone which has increased extracellular polymer content, in an anoxic premixing zone. Such an anoxic premixing zone is designated by reference numeral 200 in FIG. 15. The conduits entering into anoxic premixing zone 200 are conduits 14 and 18 from FIG. 11. By retaining and premixing the sludges in zone 200 for a period of time as further described below in zone 200 and thereafter passing the mixed sludges via conduit 202 to aerobic/mixing zone 204, it has been found that still further important improvements in the solids separation characteristics and further important improvements in reduced BOD and purified wastewater area achieved. The sludge which has been subjected to aerobic/mixing in zone 204 passes via conduit 22 as described above in FIG. 11.

The processes of FIGS. 12, 13, and 14 may all be modified by including the anoxic premixing zone upstream of the aerobic/mixing zone as described above in connection with FIG. 11. Accordingly, the conduits feeding premixing zone 200 may be conduits 58 and 74 as in FIG. 12, conduits 108 and 124 as in FIG. 13, or Conduits 158 and 182 as in FIG. 14.

With respect to the processes of FIGS. 11–14, as modified as described in FIG. 15, it has been found that the adapted processes may be effective for the removal of the nutrients nitrogen and phosphorous from waste streams. It is known that aerobic biological oxidation results in the oxidation of nitrogen in the form of ammonia to nitrogen in the form nitrate. In the instant processes, the nitrate nitrogen can be removed by denitrification to nitrogen gas in the anoxic premixing zone or the anoxic/anaerobic zone.

Turning now to the embodiments of FIGS. 16–33, these embodiments facilitate nitrogen removal by passing effluent from a main aerobic biological oxidation zone (where ammonia nitrogen has been oxidized to nitrate nitrogen) to an anaerobic (FIGS. 22–24) or an anoxic (FIGS. 16–21, 25–27, 31–33) zone where the nitrate nitrogen is reduced to molecular nitrogen (nitrogen gas) by microbial action.

With respect to phosphorous, its removal starts in the anoxic/anaerobic zone where phosphorous is released from the sludge into the liquid, and its removal ends in the aerobic/mixing zone by exuberant incorporation of the phosphorous from the aerobic biological oxidation into the aerobic/mixing biomass.

The embodiments of the present invention illustrated in FIGS. 16–33 further facilitate phosphate removal by introducing volatile acid into the anoxic/anaerobic zone. In this aspect of the present invention, the uptake of volatile acid by the appropriate microorganisms under anoxic, anaerobic or anoxic/anaerobic conditions causes those microorganisms to release phosphorus into the liquid and subsequently, under aerobic conditions, those microorganisms to uptake phosphorus aggressively from the liquid, thereby permitting its removal as part of the process biomass.

Accordingly, it is found that a flexible wastewater treatment process can be carried out which not only has improved solids separation characteristics and reduced BOD, but which also effectively removes nitrogen and/or phosphorous values from the wastewater. This is achieved not only by the process modification described above in connection with FIG. 15, but also by the embodiments of FIGS. 16–33. The process can be carried out to effectively improve solids separation characteristics and reduce BOD or it can be carried out to achieve those ends together with the removal of phosphorous or the removal of nitrogen.

Following, in Table 1, are the residence time conditions in the several treatment zones which effect desired results.

TABLE 1

|  | Residence Time (in Hours) | | | |
| --- | --- | --- | --- | --- |
|  | SS.BOD | SS.BOD.P | SS.BOD.N | SS.BOD.P.N. |
| anoxic/mixing | 0.25–1.5 | 0.25–1.5 | 0.5–30 | 0.25–3.0 |
| aerobic/mixing | 0.25–1.5 | 0.5–2.0 | 0.5–1.5 | 0.5–2.0 |
| anoxic/anaerobic | 0.25–1.5 | 0.5–2.5 | 0.5–2.5 | 0.5–2.5 |

Figure 9:
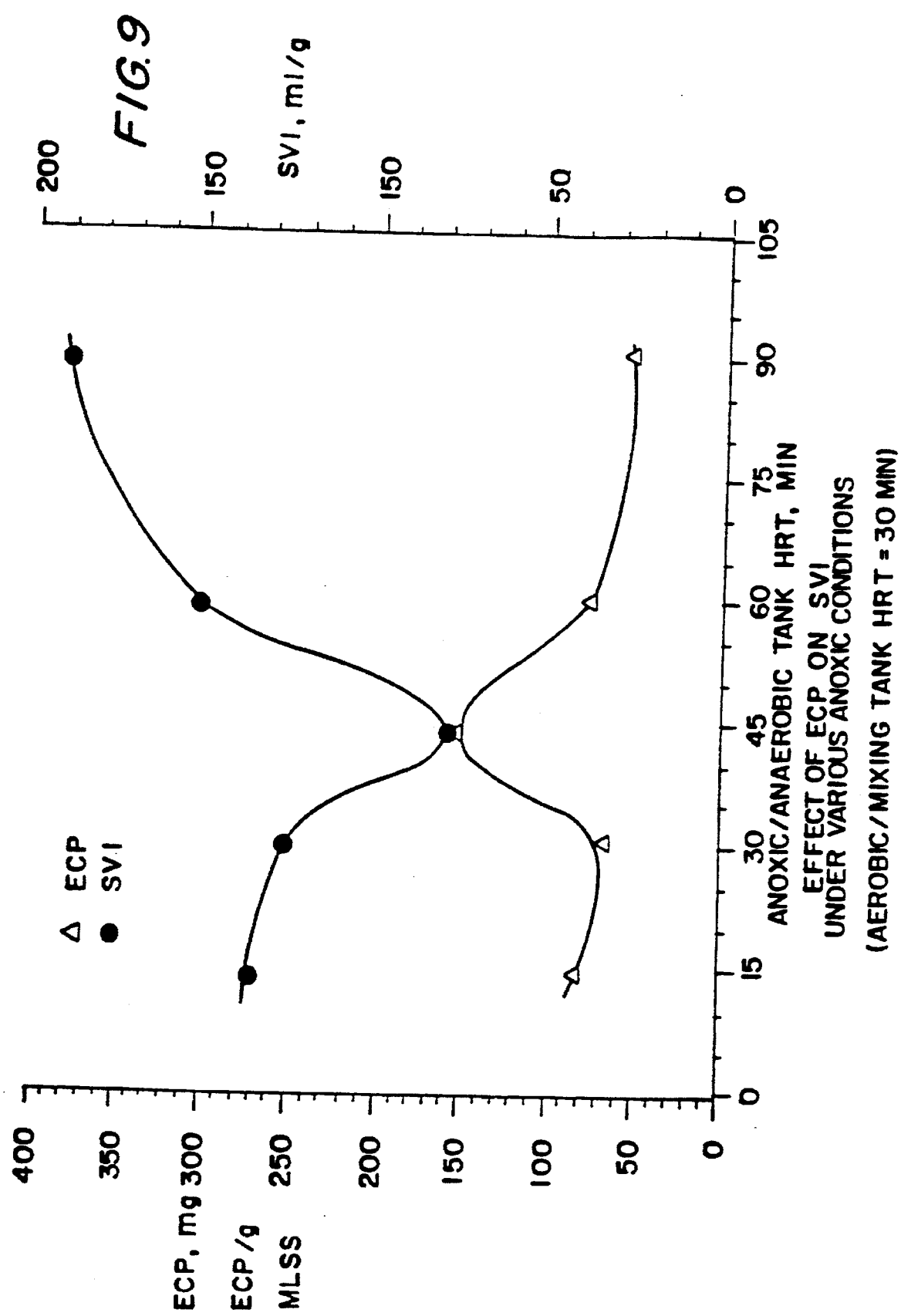
FIG. 9 is a graph of the effect Of ECP on SVI under various anoxic conditions.
Figure 10:
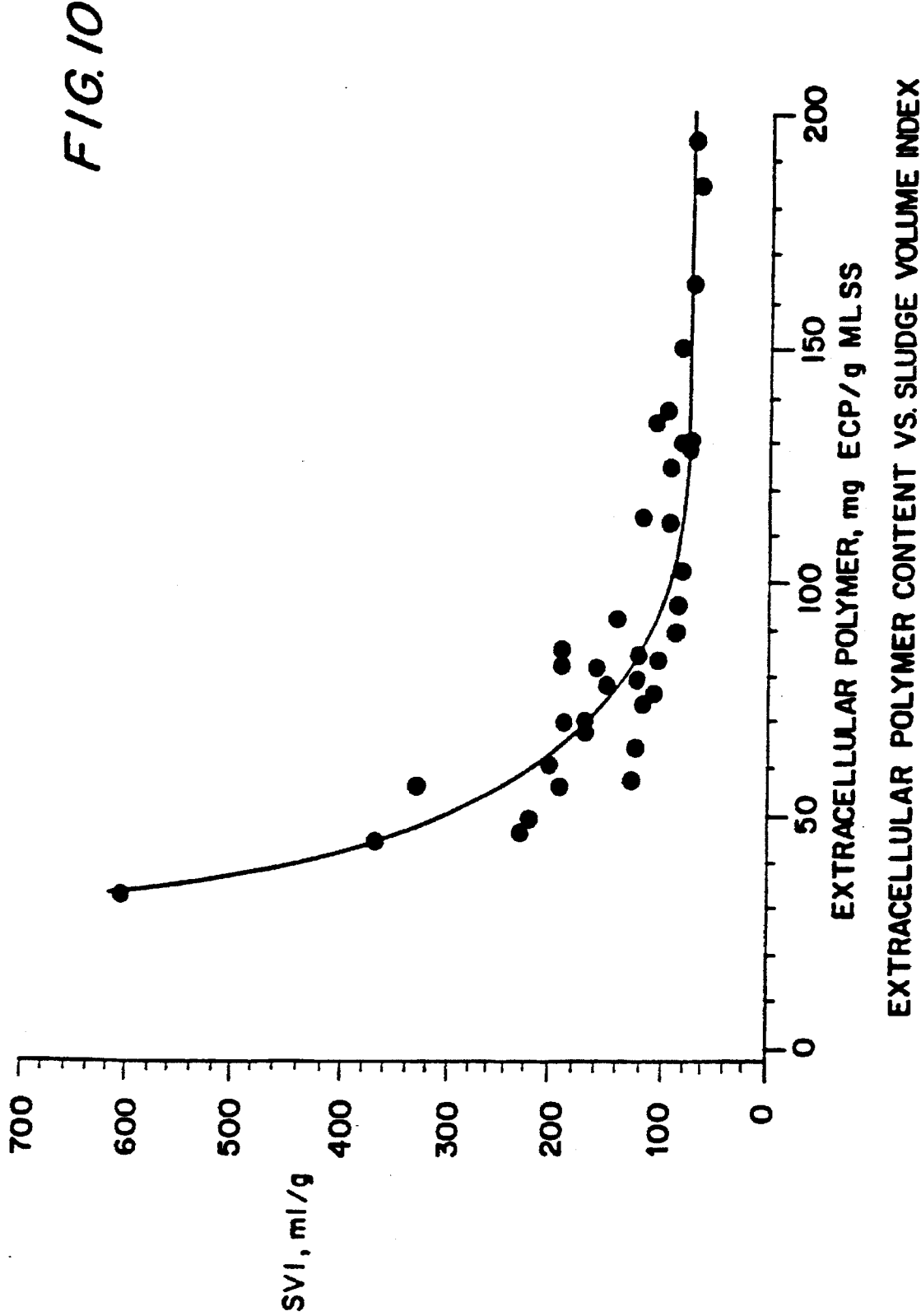
FIG. 10 is a graph of ECP constant vs. SVI.

It has now been found that trickling filter sludge settleability is a function of the extracellular polymer and is plotted against the corresponding SVI data. FIG. 9 shows that a better settling sludge represented by a low SVI has a higher ECP content. FIG. 10 also indicates that sludge settleability starts to degrade at below 90 mgECP/grMLSS and is severely degraded below 60 mgECP/grMLSS. Below 60 mgECP/grMLSS, the change in SVI is very sensitive to change in ECP. It is evident that the ECP content in trickling filter sludge is critical to determining the degree of bioflocculation as measured by SVI.

Effect of the Aerobic/Mixing Tank HRT (Hydraulic Retention Time)

Figure 5:
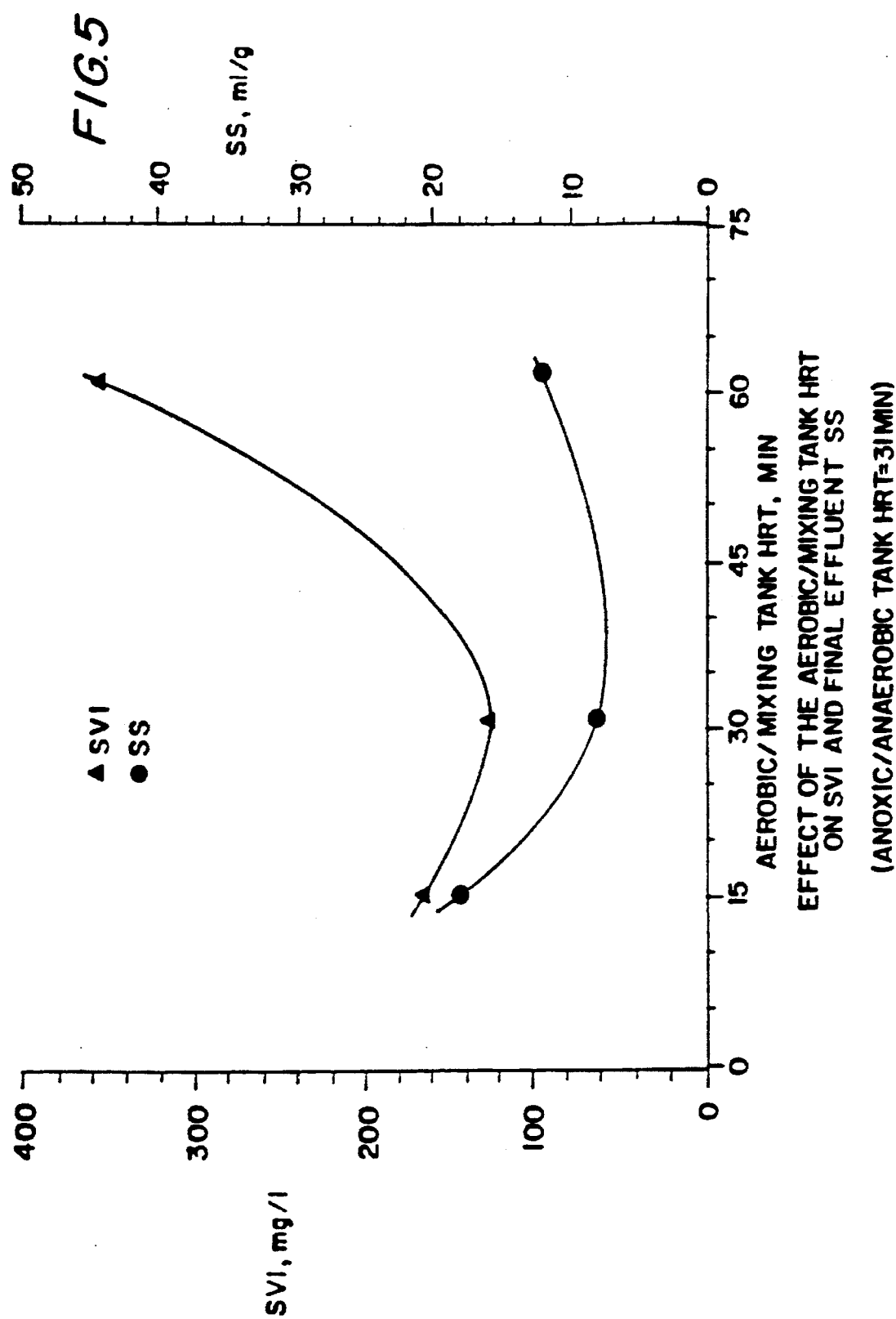
FIG. 5 is a graph of the effect of anaerobic/mixing tank HRT on SVI and final effluent SS.
Figure 6:
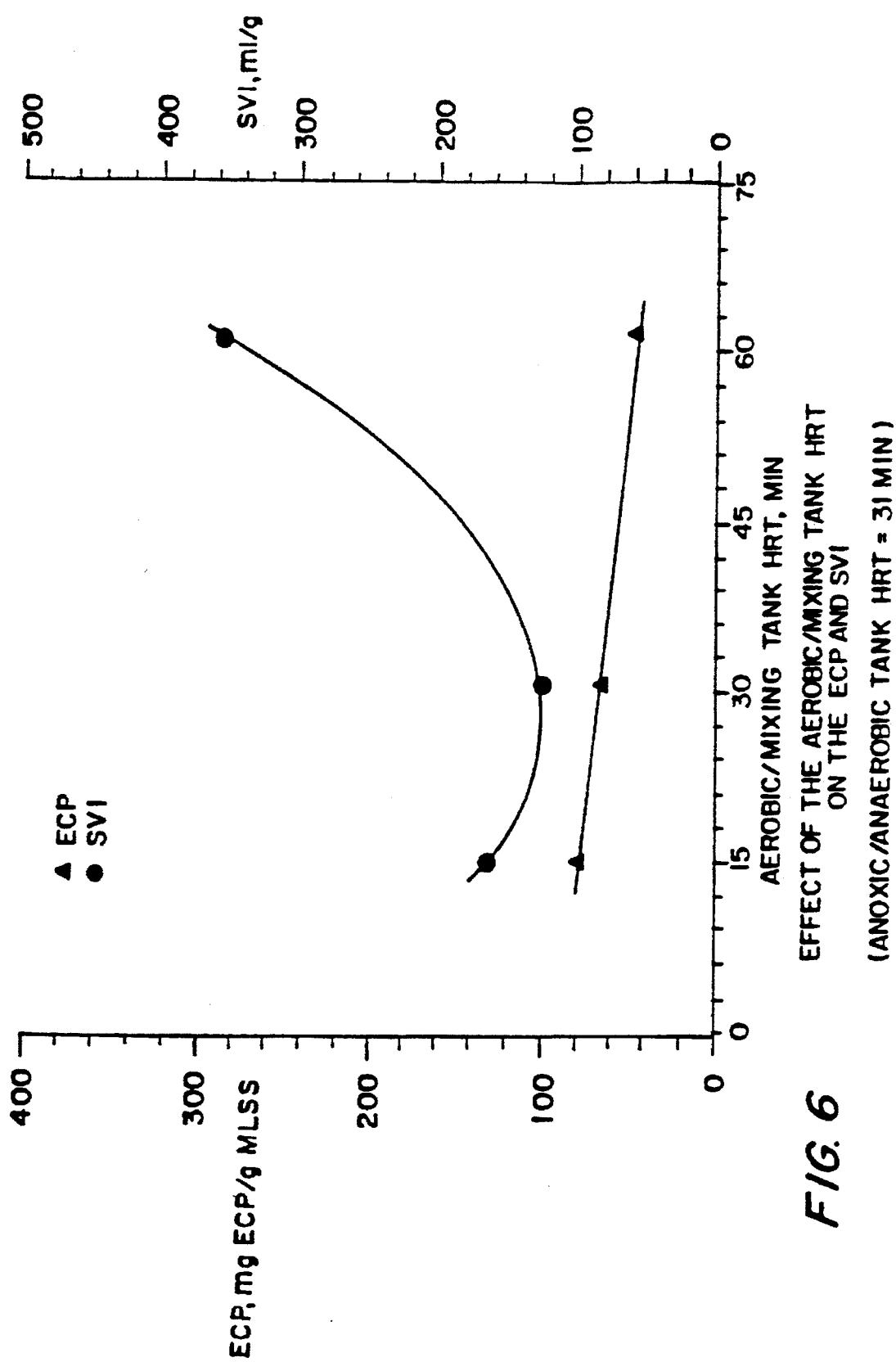
FIG. 6 is a graph of the effect of aerobic/mixing tank HRT on ECP and SVI.

The effect of varying HRT in the aerobic/mixing tank on sludge settleability and effluent quality is shown in FIGS. 5 and 6, which show the relationship between SVI, ECP, and effluent SS when aerobic/mixing tank HRT varies from 15 to 60 minutes. The longer HRT of 60 minutes did not improve the effluent SS or SVI. This may be due to particle breakup caused by extensive aeration as well as a low ECP production in the sludge.

The aerobic/mixing tank HRT of 15.5 minutes produced an effluent SCOD of 39 mg/l (SBOD$_5$ equivalent of 10 mg/l). SCOD in the effluent where HRT was longer than 30 minutes was less than 30 mg/l (or SBOD$_5$ equivalent of less than 5 mg/l), indicating that most soluble organics in the trickling filter effluent were removed at more than 30 minutes HRT in the aerobic/mixing tank.

A longer aerobic/mixing tank HRT of 62 minutes did not improve the final effluent SS quality. Experimental results showed that the final effluent SS quality was decreased due to a high SVI incorporated with the low ECP content in the sludge. A prolonged aeration period may reduce sludge settleability. Thus the aeration period in the aerobic/mixing tank must be maintained to remove the organics in the trickling filter effluent, i.e., 30 minutes, but a prolonged aeration, i.e., sixty minutes, is to be avoided to prevent the adverse effect on sludge settleability.

Effect of the Anoxic/Anaerobic Tank HRT

Figure 8:
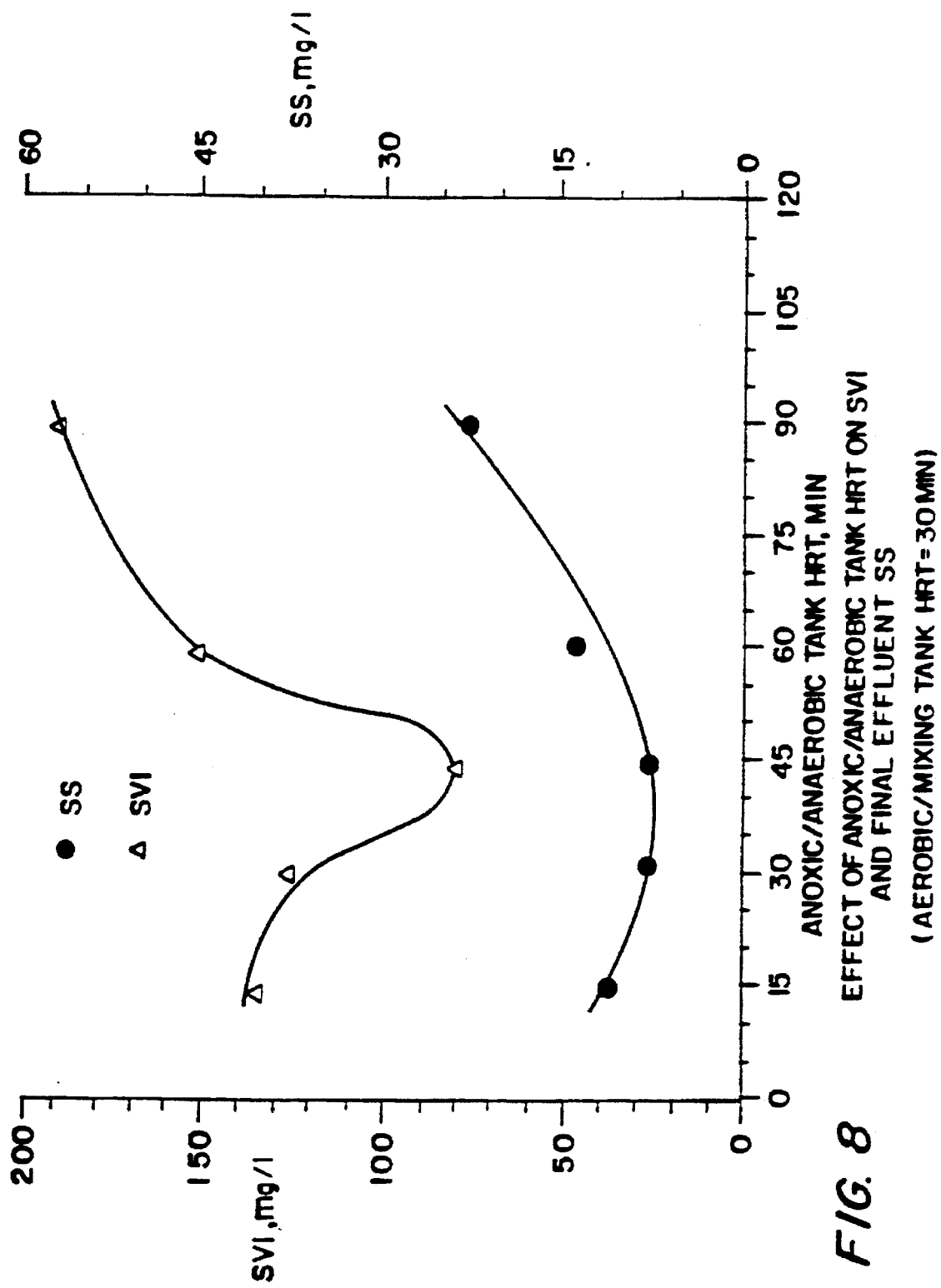
FIG. 8 is a graph of the effect of anoxic/anaerobic tank HRT on SVI and final effluent SS.

The experimental results also demonstrated the positive effect of the addition of anoxic/anaerobic treatment to trickling filter effluent treatment. FIGS. 8 and 9 show the relationship between SVI, ECP, and final effluent SS when various anoxic/anaerobic tank HRTS are used in the effluent treatment process. HRT of the aerobic/mixing tank was maintained at 30 minutes because at 30 minutes most of the soluble organics from the trickling filter effluent could be removed at the organic loading of 41 lb COD/d/1000 ft$^3$ (0.67 kg COD/d/m$^3$). The figures showed that SVI was lowest at 45 minutes of anoxic/anaerobic tank HRT.

Figure 7:
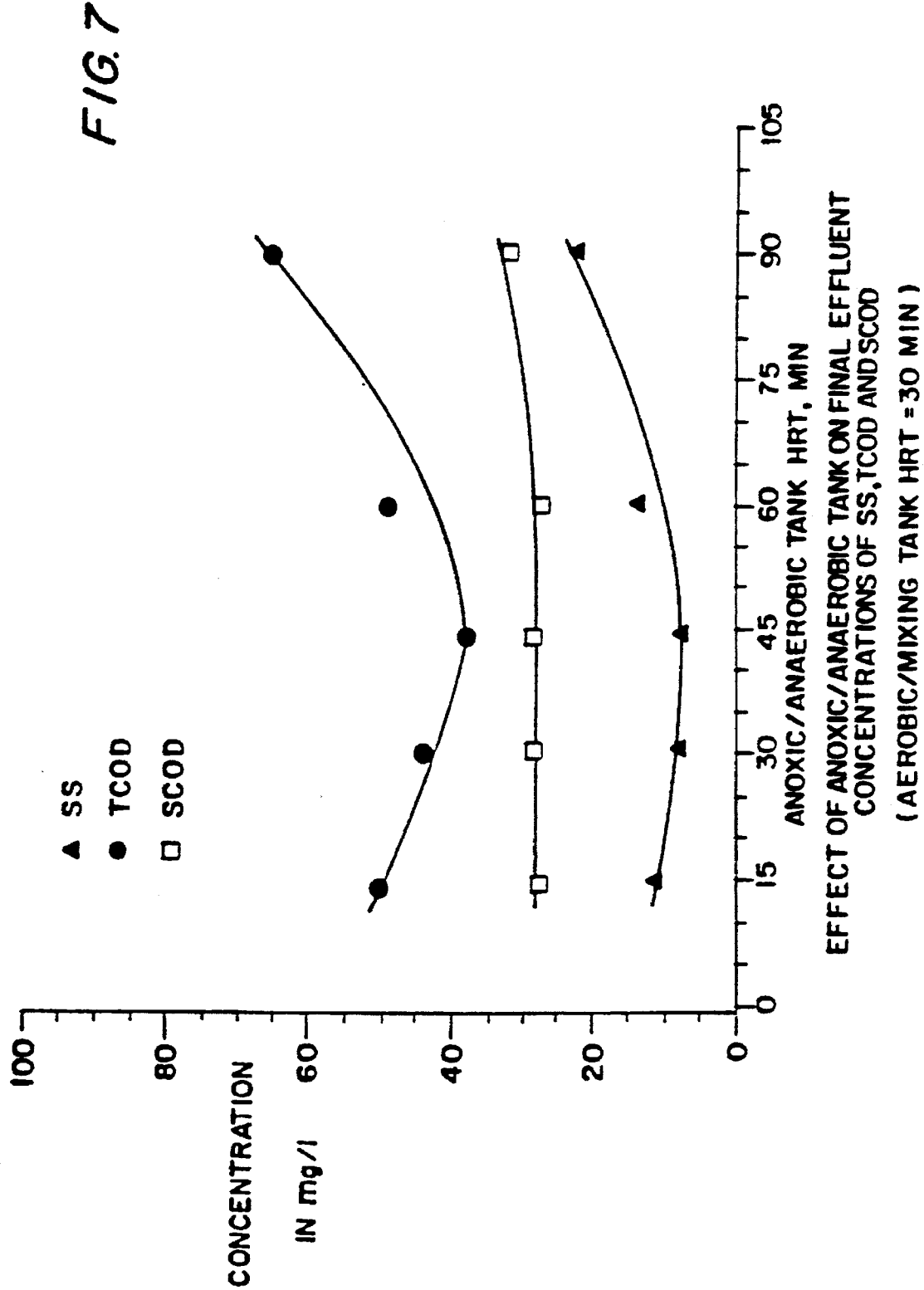
FIG. 7 is a graph of the effect of anoxic/anaerobic tank HRT on final effluent qualities, including concentrations of SS, TCOD, and SCOD.

The better settling sludge due to a better flocculation may be attributed to high ECP content in the sludge. The ECP content was highest at 45 minutes of anoxic/anaerobic tank HRT as shown in FIG. 9. ECP content in the sludge after more than 45 minutes of anoxic/anaerobic tank HRT was not increased. The experimental results indicate that an extensive anoxic/anaerobic treatment does not produce more ECP in the sludge. Sludge settleability at anoxic/anaerobic treatment periods of more than 45 minutes was actually decreased due to the lower ECP content. The decrease in ECP content in the sludge could be a result of degradation of ECP due to the extensive lytic activity associated with hydrolysis of polymeric of polymeric materials. At 91 minutes of anoxic/anaerobic treatment, the final effluent SCOD was actually increased to 32.2 mg/l, as shown in FIG. 7. The increase in SCOD may be due to the production of refractory materials at prolonged anoxic/anaerobic treatment. Therefore, the results indicate that anoxic/anaerobic tank HRT of less than 45 minutes achieves maximum settling efficiency in association with ECP production.

Turning now to the process of the invention illustrated in FIG. 16, raw wastewater enters a primary settling zone or tank 300 where suspended solids are separated from wastewater. The wastewater is passed, as effluent, to a main aerobic biological oxidation zone 310 (that incorporates and retains the characteristics of the aerobic biological oxidation zone of the embodiments of FIGS. 11–15) via wastewater liquid conduit 302. In the main aerobic biological zone 310 a portion of the biochemical oxygen demand is removed by oxidation and at least a portion of the ammonia nitrogen content ($NH_3$—N) of the wastewater is oxidized to nitrate nitrogen ($NO_3$—N). This nitrogen conversion is referred to as nitrification. In order for nitrification to occur by microbial oxidation the biochemical oxygen demand must be significantly decreased, such as to a level of 14 mg/l or less. This is because autotrophic bacteria, such as species of Nitrosommonas and Nitrobacter, are responsible for the conversion of ammonia-nitrogen to nitrate-nitrogen. Initially, the activity of heterotrophic bacteria, such as species of Bacillus predominate in the aerobic biological oxidation zone 310 as these heterotrophs metabolyze BOD. This heterotrophic activity successfully limits the activity of the nitrifying autotrophs until the BOD has decreased to a sufficiently low level that heterotrophic activity is limited and autotrophic activity can dominate. The same effect, i.e., autotrophic dominance would inherently be achieved with a wastewater that started with sufficiently low BOD, such as 14 mg/l or less.

The effluent from main aerobic biological oxidation zone 310 is passed to a zone to which no additional oxygen is added, such as an anoxic zone 315, through effluent liquid conduit 312. The effluent from the anoxic zone 315 is passed to an aerobic/mixing zone 320 (which incorporates and retains the characteristics of the aerobic/mixing zone of the embodiments of FIGS. 11–15) via effluent liquid conduit 317.

In the anoxic zone 315 one or more volatile acids are available and the bacteria in the presence of such volatile acids and under conditions where no additional oxygen is added, release phosphate in the zone 315.

In the aerobic/mixing zone 320 bacteria rapidly take up phosphate from the effluent, acting to remove not only the phosphate content released in the anoxic zone 315 but also phosphate content from the effluent from the main aerobic biological oxidation zone 310. Purified wastewater from the aerobic/mixing zone 320 is passed through a conduit 322 to a final settling zone 330 (which incorporates and retains the characteristics of the final settling zone of the embodiments of FIGS. 11–15) where suspended solids are separated from the purified wastewater and exit through solids conduit 332 while the purified wastewater exits from the system through liquid conduit 334. A portion of the suspended solids from final settling zone 330 are recycled back to the mainstream flow (from main aerobic biological oxidation zone 310, liquid conduit 312, anoxic zone 315, liquid conduit 317, aerobic/mixing zone 320, liquid conduit 322 and final settling zone 330) as sludge via solids conduits 332 and 334', so as to facilitate the process and confer the benefits of the present invention. The remainder of suspended solids from the final settling zone 330 exit from the process as sludge via solids conduit 336.

The anoxic zone 315 has a significant function in phosphorus removal. At least a portion of the sludge formed from suspended solids settling are removed via the primary settling zone 300 and passed to a primary sludge fermentation zone 340 via a solids conduit 303. The fermentation zone 340 produces volatile acids and/or their carboxylates, such as acetic, n-propionic, n-butyric and/or lactic acids and/or their carboxylates, such as sodium acetate, through a short term anaerobic fermentation lasting about 0.5 to about 3 days. An example of volatile acid production from the fermentation of both a primary sludge and a rotating biological contactor sludge from both a wastewater treatment plant and a laboratory scale process is shown in Table 2.

TABLE 2

VOLATILE ACID PRODUCTION AT DIFFERENT DETENTION TIMES

| Detention Time | Volatile Acid Production, mg/l as Acetic Acid | | |
|---|---|---|---|
| (hours) | Pri. Sludge | RBC Sludge | Lab RBC Sludge |
| 0 | 760 | 330 | 380 |
| 4 | 1180 | 910 | 930 |
| 8 | 1280 | 1020 | 1160 |
| 12 | 1440 | 1290 | 1400 |
| 16 | 1500 | 1680 | 1560 |
| 20 | 1450 | 1650 | 1530 |
| 24 | 1550 | 1730 | 1620 |
| 30 | 1600 | 1800 | 1700 |
| 36 | 1720 | 1740 | 1820 |
| 48 | 1750 | 1850 | 1750 |
| 60 | 1810 | 1870 | 1870 |
| 72 | 1690 | 1790 | 1660 |

Table 2 shows that volatile acid, reported here in the form of acetic acid can be produced by primary and rotating biological contactor sludges at plant scale and by rotating biological contactor sludge at laboratory scale. Following fermentation, spent solids are separated from the liquid in sludge fermentation zone 340 and the solids are removed from the system via solids conduit 342. Liquid effluent from the primary sludge fermentation zone 340 with its attendant volatile acid content is introduced into anoxic zone 315 via a liquid conduit 344 and the volatile acid is added to the anoxic zone 315 as part of the effluent passing through liquid conduit 312. In the anoxic zone 315 volatile acids are taken up by the bacteria, causing them to release phosphate into the effluent. In addition, the anoxic conditions in the anoxic zone 315 reduce the nitrate nitrogen ($NO_3$—N) to molecular nitrogen (denitrification) that can be in the effluent as a gas, thereby decreasing the nitrogen level of the effluent. Effluent from the main aerobic biological oxidation zone 310, including suspended solids from the final settling zone 330, is treated by residence in the anoxic zone 315 and the volatile acid and the thus-treated bacteria are introduced into aerobic/mixing zone 320 via liquid conduit 317. In the aerobic/mixing zone 320 the bacteria, upon exposure under aerobic conditions, to the phosphate content of effluent from the main aerobic biological oxidation zone 310, as well as that released in the anoxic zone 315, rapidly take up the phosphate content in the effluent incorporating it into biomass. Suspended solids from final settling zone 330 are recycled back to the mainstream flow (main aerobic biological oxidation zone 310, conduit 312, anoxic zone 315, conduit 317 aerobic/mixing zone 320, conduit 322, final settling zone 330) via conduits 332 and 334', so as to facilitate the process. The advantage of the embodiment of FIG. 16 is that, in addition to the advantages of the embodiments of FIGS. 11–15, ammonia nitrogen is converted to nitrate nitrogen (nitrification) and thence to molecular nitrogen (denitrification) thereby significantly decreasing the amount of nitrogen in the purified wastewater exiting conduit 334 and soluble phosphate is removed from the effluent by microbial uptake into biomass that is captured as suspended solids.

In the embodiments of FIGS. 16–33 the various respective corresponding zones and liquid and solid conduits are identified by the same drawing element numbers from figure to figure to facilitate understanding. It should be understood that the various respective corresponding zones and conduits in the embodiments of FIGS. 17–33 perform and function in the same manner as has been discussed with respect to FIG. 16, except as may be noted in the discussion of a particular embodiment.

In the embodiment of FIG. 17 suspended solids from final settling zone 330 are used as a source to produce volatile acid rather than primary sludge as in the embodiment of FIG. 16. While a portion of the suspended solids from final settling zone 330 pass directly to the liquid conduit 312 to the anoxic zone 315 through solids conduits 332, 333, 335, and 337, a second portion passes to a final sludge fermentation zone 350 via solids conduits 332 and 338. The suspended solids in final sludge fermentation zone 350 are anaerobicly fermented for from about one half to about three days, thereby producing one or more of the aforesaid volatile acids and/or carboxylates. Effluent from final sludge fermentation zone 350 (with volatile acid and fermented suspended solids) is introduced to the anoxic zone 315 via liquid/solids conduits 339, 337 and 312 where they, along with suspended solids from solids conduits 332, 333, 335 and 337, are processed in the same way as the effluent from primary sludge fermentation zone 340 and the suspended solids from final settling zone 330 in the embodiment of FIG. 16 are processed. The advantage of the embodiment of FIG. 17, other than those stated for the embodiment of FIG. 16, is that the use of final settled biological sludge as a source of volatile acids for increased phosphorus removal does not add additional BOD and particulate solids from outside the biological process zone to the main effluent stream as does the primary sludge fermentation approach of the embodiment of FIG. 16. In addition the biological sludge is more easily handled than primary sludge. Further, a portion of the suspended solids biomass is fermented, or digested, to a liquid form that is disposed of more easily. However, fermentation of primary sludge does add some additional nitrogen and phosphorous along with volatile acids to the system and therefore increase the nitrogen and phosphorous loading of the wastewater treatment plant. No such outside nitrogen and phosphorous loading would be present when using the fermented products of the final settled biological sludge. Thus, if no increase is allowed in nitrogen and phosphorous loading by government regulations, final settled biological sludge would be a very valuable option for volatile acid production.

Figure 18:
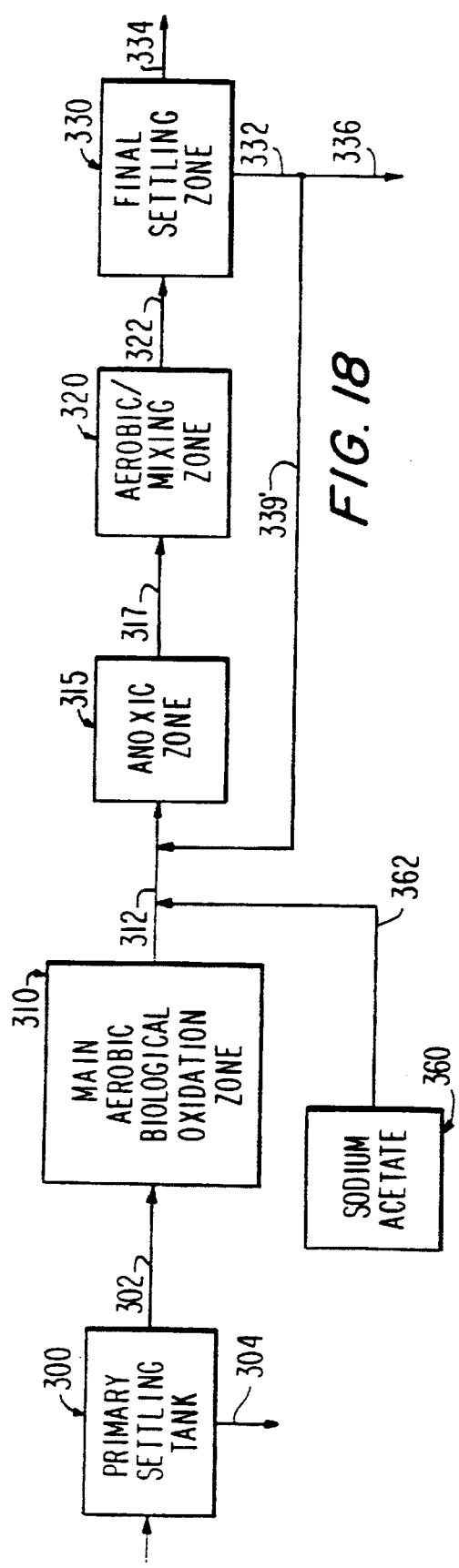

In the embodiment illustrated in FIG. 18, volatile acid is provided as an addition of sodium acetate from a sodium acetate source 360. The sodium acetate is provided as an aqueous solution to provide a concentration of from 30 to 150 mg/l, in anoxic zone 315 or preferably from 50 to 100 mg/l, through liquid conduit 362 to liquid conduit 312 and, thence, into anoxic zone 315 where it acts as does the volatile acid addition in the embodiments of FIGS. 16 and 17. In those situations where the raw wastewater lacks sufficient anaerobicly fermentable substrates for the production of an adequate level of volatile acid and/or carboxylate for phosphate removal, it may be desirable to use the embodiment of the invention illustrated in FIG. 18. Further, where anaerobic fermentation is used such as in the embodiments illustrated in FIGS. 16 or 17, but supplemental volatile acid is needed on a long or short term basis, it may be desirable to provide supplemental volatile acid such as is illustrated in FIG. 18.

It should be understood that the embodiments illustrated in FIGS. 16 through 18 can be combined such that volatile acid can be provided by a primary sludge fermentation zone 340 and a final sludge fermentation zone 350 or by a primary sludge fermentation zone 340 and a sodium acetate source 360 or by a final sludge fermentation zone 350 and a sodium acetate source 360 or by all three sources.

Figure 19:
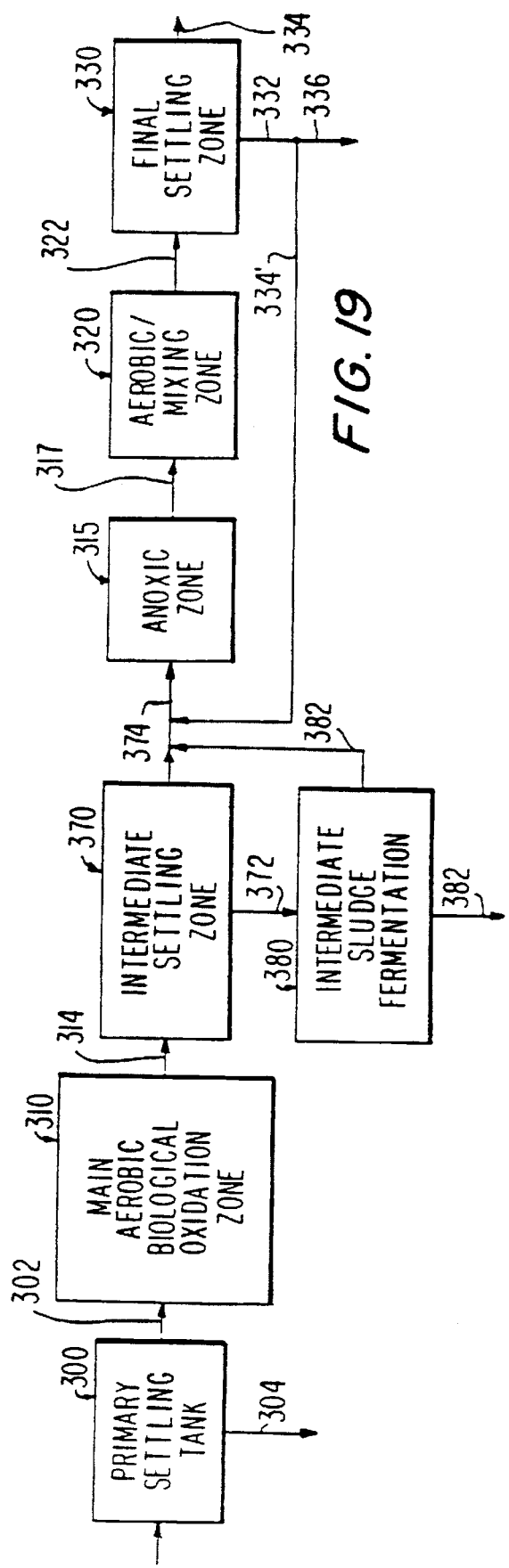

The embodiment illustrated in FIG. 19 differs from that of FIG. 16 in that the effluent from main aerobic biological oxidation zone 310 is passed through a liquid conduit 314 to an intermediate settling zone 370 where suspended solids are separated from the effluent and passed as sludge through a solids conduit 372 to an intermediate sludge fermentation zone 380. The effluent from the intermediate settling zone 370 is passed via liquid conduit 374 to anoxic zone 315. The sludge from intermediate settling zone 370 is anaerobicly fermented for from about one half day to about three days in the intermediate sludge fermentation zone 380 to produce volatile acid. The effluent from intermediate sludge fermentation zone 380, containing volatile acid is conveyed through a liquid conduit 382 to the liquid conduit 374 and, thence, into anoxic zone 315 where it facilitates phosphate removal as aforesaid. Fermented sludge is removed from the intermediate sludge fermentation zone 380 and exhausted from the process via a solids conduit 382. Primary sludge is removed from the primary settling tank 300 and exhausted from the process via solids conduit 304. In this embodiment of the invention, intermediate sludge is used as a source for volatile acid rather than primary sludge or final sludge as in the embodiment of FIGS. 16 and 17. The advantages that this provides are that the intermediate sludge contains biologically active solids before any further biological treatment as would not be the case for final settled biological solids. The intermediate sludge would have a higher organic content for better fermentation for production of volatile acid.

The embodiment of FIG. 20 varies from the embodiments of FIGS. 16 and 19 in that the effluent from the primary sludge fermentation zone 340 (of the embodiment of FIG. 16), containing volatile acid, is passed to the intermediate sludge fermentation zone 380 (of the embodiment of FIG. 19) where anaerobic fermentation of the intermediate sludge supplements its volatile acid content. The now-combined effluents of the primary sludge fermentation zone 340 and the intermediate sludge fermentation zone 380, containing volatile acid, are passed to the anoxic zone 315 by liquid conduits 382 and 374. The advantage of this embodiment is the addition of unused organics from the primary fermentation zone for sludge fermentation in the intermediate sludge fermentation zone for producing volatile acid.

The embodiment illustrated in FIG. 21 is a variant on the embodiment of FIG. 20 in that the effluent from the primary sludge fermentation zone 340 passes directly to the anoxic zone 315 via liquid conduits 348 and 374 rather than passing to the intermediate sludge fermentation zone 380. The advantage is that each zone is separate and therefore cannot inhibit the other biological fermentation for volatile acid. While the embodiment of FIG. 20 connects the primary sludge fermentation zone 340 in series with the intermediate sludge fermentation zone 380, the embodiment illustrated in FIG. 21 connects the two in parallel with each other.

Turning now to the embodiment illustrated in FIG. 22 effluent from main aerobic biological oxidation zone 310 is introduced to an anaerobic zone 390 via conduit 312. In anaerobic zone 390 at least a portion of the nitrate nitrogen content of the effluent is reduced to molecular nitrogen (nitrogen gas). Effluent from anaerobic zone 390 is introduced to aerobic/mixing zone 320 via liquid conduit 392. In this embodiment, effluent from an anoxic/anaerobic zone 400 is introduced to anaerobic zone 390 via liquid conduit 402 and 312. Further, a portion of the effluent from primary sludge fermentation zone 340 with its volatile acid content is introduced into anaerobic zone 390 via liquid conduits 347, 347A and 312, while the remainder is passed to anoxic/anaerobic zone 400 via conduit 347, 347B, and 334'. In this way, volatile acid from primary sludge fermentation zone 340 and suspended solids from final settling zone 330 are treated in anoxic/anaerobic zone 400 where there is an initial volatile acid uptake and phosphate release and then a further portion of volatile acid from primary sludge fermentation zone 340 and effluent from the anoxic/anaerobic zone 400 are treated in anaerobic zone 390 where there is a second volatile acid uptake and a second phosphate release. Consequently, the phosphate uptake in aerobic/mixing zone 320 is even more robust. A further advantage of the embodiment of FIG. 22 is that it is possible to release additional phosphate by adding an anaerobic zone before the aerobic/mixing zone. This can provide a means to improve the total phosphate removal as well as the removal of nitrate formed in the main aerobic biological oxidation zone by reduction to molecular nitrogen. The volatile acids from the primary sludge fermentation zone 340 can be passed to both the anoxic/anaerobic zone 400 and the anaerobic zone 390. The anaerobic zone use in FIGS. 22–24 has the advantage of combining nitrate reduction and phosphate release in the same process unit. In normal practice nitrate can inhibit phosphate release. However, it has been found that by adding volatile acid to the anaerobic zone, it can be possible to do both in one tank or zone.

The embodiment illustrated in FIG. 23 is similar to the embodiment of FIG. 22, except that volatile acid is provided by a final sludge fermentation zone 350 rather than a primary sludge fermentation zone 340 as in the embodiment of FIG. 22. In this embodiment, a portion of the effluent from final sludge fermentation zone 350 is introduced to anaerobic zone 390 via liquid conduits 339, 352 and 312 while the remainder passes to anoxic/anaerobic zone 400 via liquid conduits 339 and 354. In addition, a portion of the sludge from final settling zone 330 is conveyed by solids conduits 332, 336 and 336' to anoxic/anaerobic zone 400 for treatment as aforesaid. In this way, there is an initial uptake of volatile acid and release of phosphate in anoxic/anaerobic zone 400, followed by a second uptake of volatile acid and release of phosphate in anaerobic zone 390 as in the embodiment of FIG. 22. The advantage of this embodiment is in the further facilitation of phosphate removal as in the embodiment of FIG. 22 coupled with the advantage of biological sludge fermentation. The advantage of the embodiment of FIG. 17, other than those stated for the embodiment of FIG.

16, is that the use of final settled biological sludge as a source of volatile acids for increase phosphorus removal does not add additional BOD and particulate solids from outside the biological process zone to the main effluent stream as does the primary sludge fermentation approach of the embodiment of FIG. 16. In addition the biological sludge is more easily handled than primary sludge. Further, a portion of the suspended solids biomass is fermented, or digested, to a liquid form that is disposed of more easily. However, fermentation of primary sludge does add some additional nitrogen and phosphorous along with volatile acids to the system and therefore increase the nitrogen and phosphorous loading of the wastewater treatment plant. No such outside nitrogen and phosphorous loading would be present when using the fermented products of the final settled biological sludge. Thus, if no increase is allowed in nitrogen and phosphorous loading by government regulations, final settled biological sludge would be a very valuable option for volatile acid production.

The embodiment illustrated in FIG. 24 is similar to those illustrated in FIGS. 22 and 23 except that volatile acid is provided to the anaerobic zone 390 by both a primary sludge fermentation zone 340 and a final sludge fermentation zone 350. Consequently, a portion of the volatile acid-containing effluent from the primary sludge fermentation zone 340 and a portion of the volatile acid-containing effluent from the final sludge fermentation zone 350 are conveyed directly to the anaerobic zone 390 directly by liquid conduits 347, 347A and 312 and by liquid conduits 339, 352 and 312, respectively. The remainder of the volatile acid-containing effluent from these two fermentation zones is conveyed to the anoxic/anaerobic zone 400 by liquid conduits 347 and 347B and liquid/solid conduit 347C and by liquid conduits 339 and 354, respectively. In this way, as in the embodiments of FIGS. 22 and 23, there is an initial uptake of volatile acid and release of phosphate in anoxic/anaerobic zone 400, followed by a second uptake of volatile acid and release of phosphate in anaerobic zone 390 as well as the removal of nitrate formed in the main aerobic biological oxidation zone by reduction to molecular nitrogen. The advantage of this embodiment is in the further facilitation of phosphate removal as in the embodiment of FIGS. 22 and 23 coupled with the liquification of biomass as in the embodiment of FIG. 23.

The embodiment illustrated in FIG. 25, is similar to the embodiment of FIG. 22, except that effluent from main aerobic biological oxidation zone 310 is introduced to an anoxic zone 315 via conduit 312. In anoxic zone 315, at least a portion of the nitrate nitrogen content of the effluent is reduced to molecular nitrogen (nitrogen gas). Effluent from anoxic zone 315 passes to an anaerobic zone 390 via liquid conduit 317. The anaerobic zone 390 reduces a further portion of the nitrate nitrogen content of the effluent to molecular nitrogen (nitrogen gas.) A portion of the effluent from anoxic/anaerobic zone 400 is introduced into anoxic zone 315 via liquid conduits 402 and 404 while the remainder is passed to anaerobic zone 390 via liquid conduits 402 and 406. Further, a portion of the effluent from primary sludge fermentation zone 340 with its volatile acid content is introduced into anaerobic zone 390 via liquid conduits 347, 347A and 317, while the remainder is passed to anoxic/anaerobic zone 400 via conduit 347B and 334'. As in the embodiment of FIG. 20, a portion of the effluent from the primary sludge fermentation zone 340 is provided to anaerobic zone 390 and the remainder to anoxic/anaerobic zone 400, all to the same effect as the embodiment of FIG. 22. In FIGS. 22–24 the anaerobic tank serves both as a zone for nitrate reduction and as a zone for phosphate release. However, it is possible that these conditions might create longer hydraulic detention times which could be excessive or require excessive volatile acid levels. Therefore, in FIGS. 25–27 the nitrate reduction and phosphate release are separated by adding an anoxic zone before the anaerobic zone. This allows separation of the nitrate reduction in the anoxic zone and phosphate release in the anaerobic zone. The need for volatile acid addition might be less critical in this instance.

The embodiment of FIG. 26, is similar to the embodiment of FIG. 25, except that volatile acid is provided by a final fermentation zone 350. A portion of the effluent from final sludge fermentation zone 350 is provided to anaerobic zone 390 via liquid conduits 339, 352 and 317 while the remainder is passed to anoxic/anaerobic zone 400 via liquid conduits 339 and 354 to the same effect as the embodiment of FIG. 23. While a portion of the final sludge from final settling zone 330 is provided to final fermentation zone 350 by solids conduits 332 and 338 as a substrate for anaerobic fermentation to volatile acid, a further portion is provided to the anoxic/anaerobic zone 400 via solids conduits 332, 336 and 336' for the aforesaid purposes. The advantage of the embodiment of FIG. 17, other than those stated for the embodiment of FIG. 16, is that the use of final settled biological sludge as a source of volatile acids for increase phosphorus removal does not add additional BOD and particulate solids from outside the biological process zone to the main effluent stream as does the primary sludge fermentation approach of the embodiment of FIG. 16. In addition the biological sludge is more easily handled than primary sludge. Further, a portion of the suspended solids biomass is fermented, or digested, to a liquid form that is disposed of more easily. However, fermentation of primary sludge does add some additional nitrogen and phosphorous along with volatile acids to the system and therefore increase the nitrogen and phosphorous loading of the wastewater treatment plant. No such outside nitrogen and phosphorous loading would be present when using the fermented products of the final settled biological sludge. Thus, if no increase is allowed in nitrogen and phosphorous loading by government regulations, final settled biological sludge would be a very valuable option for volatile acid production.

The embodiment illustrated in FIG. 27 is similar to those illustrated in FIGS. 25 and 26, except that volatile acid is provided by both a primary sludge fermentation zone 340 and a final sludge fermentation zone 350, just as in the embodiment of FIG. 24, with a portion of each going to the anaerobic zone 390 and the remainder going to the anoxic/anaerobic zone 400. Also, as in the embodiments of FIGS. 25 and 26, a portion of the effluent from anoxic/anaerobic zone 400 is introduced into anoxic zone 315 via liquid conduits 402 and 404 while the remainder is passed to anaerobic zone 390 via liquid conduits 402 and 406 to the same effect as in the embodiments of FIGS. 25 and 26. By use of both primary and final sludge fermentation zones, the final volatile acid content is increased and is capable of resulting in better removal of nitrogen, and phosphorus as well as BOD and SS.

Turning now to the embodiment illustrated in FIG. 28, effluent enters a primary settling tank or zone 300 where suspended solids are separated from the effluent. The effluent is then passed to an main aerobic biological oxidation zone 310 (which incorporates and retains the characteristics of the aerobic biological oxidation zone of the embodiments of FIGS. 11–15) via liquid conduit 302. In the aerobic biological zone 310 a portion of the biochemical oxygen demand is removed by oxidation and at least a portion of the ammonia nitrogen content of the wastewater is oxidized to nitrate nitrogen. Further, at least a portion of the biochemical oxygen is converted to suspended solids. The effluent from main aerobic biological oxidation zone 310 is then passed to an aerobic/mixing zone 320 (which incorporates and retains the characteristics of the aerobic/mixing zone of the embodiments of FIGS. 11–15) via liquid conduit 312.

In the aerobic/mixing zone 320 bacteria rapidly take up phosphate from the liquid, acting to remove phosphate content from the effluent from the main aerobic biological oxidation zone 310. Purified wastewater from the aerobic/mixing zone 320 is passed through liquid conduit 322 to a final settling zone 330 (which incorporates and retains the characteristics of the final settling zone of the embodiments of FIGS. 11–15) where sludge, including suspended solids, is separated from purified wastewater and exits through solids conduit 332 while purified wastewater exits from the system through liquid conduit 334. At least a portion of the sludge, including suspended solids from the final settling zone 330, are introduced, via conduits 332 and 334', into an anoxic/anaerobic zone 400 (which incorporates and retains the characteristics of the anoxic/anaerobic zone of the embodiments of FIGS. 11–15). Hence, suspended solids from final settling zone 330, are recycled back to the mainstream flow (main aerobic biological oxidation zone 310, conduit 312, aerobic/mixing zone 320, conduit 322, final settling zone 330) via solids conduits 332 and 334', anoxic/aerobic zone 400 and liquid conduit 402 so as to facilitate the process and confer the benefits of the present invention. In addition, anoxic/anaerobic zone 400 has an additional function in phosphorus removal. At least a portion of the sludge removed via the primary settling zone 300 is passed to a primary sludge fermentation zone 340 via a solids conduit 303. The primary sludge fermentation zone 340 produces volatile acid, through a short term, anaerobic fermentation, such as, about 0.5 to about 3 days.

Following fermentation, spent solids are separated from the liquid in primary sludge fermentation zone 340 and the solids are removed from the system via solids conduit 342. Liquid effluent from the primary sludge fermentation zone 340 with its attendant volatile acid content is provided to the anoxic/anaerobic zone 400 via a liquid/solid conduit 347'. In the anoxic/anaerobic zone 400 volatile acids are taken up by bacteria, causing them to release phosphate. Effluent from the anoxic/anaerobic zone 400, including the suspended solids from the final settling zone 330, as treated by residence in the anoxic/anaerobic zone 400, and the volatile acid and the thus-treated bacteria are introduced into aerobic/mixing zone 320 via liquid/solids conduit 402 and liquid conduit 312. In the aerobic/mixing zone 320 the bacteria, upon exposure to the additional phosphate content from effluent from the main aerobic biological oxidation zone 310 under aerobic conditions rapidly take up both the phosphate content from the main aerobic biological oxidation zone 310 and the previously released phosphate content in the effluent from the anoxic/anaerobic zone, incorporating it into biomass. Suspended solids from final settling zone 330 are recycled back to the mainstream flow (main aerobic biological oxidation zone 310, conduit 312, aerobic/mixing zone 320, conduit 322, final settling zone 330) via conduits 332 and 334', anoxic/anaerobic zone 400 and conduits 402 and 312 so as to facilitate the process as previously described with respect to the embodiments of FIGS. 11–15. The advantage of the embodiment illustrated in FIG. 28 is that, in addition to the advantages of the embodiments of FIGS. 11–15, ammonia nitrogen is converted to nitrate nitrogen thereby significantly decreasing the amount of ammonia nitrogen released by the process and soluble phosphate is removed from the purified wastewater by microbial uptake into biomass.

In the embodiment illustrated in FIG. 29 sludge, including suspended solids, from final settling zone 330 is used as a source of volatile acid rather than primary sludge. A portion of the sludge, suspended solids, passes directly to the anoxic/anaerobic zone 400 through solids conduits 332, 333 and 335. The remainder pass to a final sludge fermentation zone 350 via solids conduits 332 and 338. The sludge in final sludge fermentation zone 350 are anaerobicly fermented for from about one half to about three days, thereby producing the aforesaid volatile acids. Effluent from final sludge fermentation zone 350 (with volatile acid and fermented suspended solids) is introduced to the anoxic/anaerobic zone 400 via liquid/solids conduit 339 where they, along with suspended solids from solids conduit 335, are processed in the same way as the effluent from primary sludge fermentation zone 340 and the suspended solids from final settling zone 330 in the embodiment of FIG. 28 are processed. The advantage of the embodiment of FIG. 29, other than those stated for the embodiment of FIG. 28, is that the use of final settled biological sludge as a source of volatile acids for increase phosphorus removal will not add additional BOD and particulate solids to the process from outside the biological process zone as does the primary sludge fermentation supernatant products of the embodiment of FIG. 28. In addition, the biological sludge is more easily handled than primary sludge. Further, a portion of the suspended solids biomass is fermented, or digested, to a liquid form that is more easily disposed of. Further, fermentation of primary sludge tends to add additional nitrogen and phosphorous along with volatile acids, to the process and therefore to increase the nitrogen and phosphorous loading of the wastewater treatment process. No such outside nitrogen and phosphorous loading will be present when using the fermented products of the final settled biological sludge. Thus, if no increase is allowed in nitrogen and phosphorous loading by government regulations, final settled biological sludge would be a very valuable option for volatile acid production.

In the embodiment of FIG. 30, both primary sludge from the primary settling zone 300 and sludge, including suspended solids, from the final settling zone 330 are used to produce volatile acid. For instance, if the biological sludge from final settling zone 330 does not have sufficient or appropriate organic content to produce sufficient volatile acids rapidly enough for good phosphorous removal, fermented primary sludge can be used as a volatile acid source in addition to the biological sludge or to an outside volatile acid source, such as sodium acetate, that could also be used. A portion of final sludge, including suspended solids, is provided final sludge fermentation zone 350 by conduits 332 and 338 where it is anaerobicly fermented for from about one half day to about three days and the resulting effluent, containing volatile acid, is then provided to anoxic/anaerobic zone 400 via conduit 339. A further portion of the final sludge is provided to the anoxic/anaerobic zone 400 directly via conduits 332, 333, 336', 347C and 339. Primary sludge is provided to primary sludge fermentation zone 340 via conduit 303 where it is anaerobicly fermented for from about one half day to about three days and the resulting effluent, containing volatile acid, is provided to anoxic/anaerobic zone 400 via conduits 347', 347C and 339. Since effluent from primary sludge fermentation zone 340 and final sludge from final settling zone 330 are commonly conveyed in conduits 347C and 339, there is mixing of the two flows before introduction to anoxic/anaerobic zone 400. Similarly, since these two flows and the effluent from final sludge fermentation zone 350 are commonly conveyed in conduit 339, there is mixing of all three flows before introduction to anoxic/anaerobic zone 400. The advantage of this embodiment is that it combines the volatile acid from both primary and final fermentation zones for better release of phosphorus and nitrate reduction in the anoxic/anaerobic zone.

Turning now to the embodiments illustrated in FIGS. 31-33, respectively, these embodiments differ from those of FIGS. 28-30, respectively, in that effluent from the main aerobic biological oxidation zone 310 is provided to an anoxic zone 315 by a conduit 312 where denitrification occurs (reduction of nitrate nitrogen in the effluent from the main aerobic biological oxidation zone 310 to molecular nitrogen) and removal of nitrogen from the effluent as a gas commences. In addition, the anoxic conditions prevailing in the anoxic zone 315 and the additional phosphate content from the main aerobic biological oxidation zone 310 effluent encourage further phosphate release by bacteria in the anoxic zone 315. The effluent from the anoxic zone 315 is provided to aerobic/mixing zone 320 by conduit 317 where the aerobic conditions and the soluble phosphate content in the effluent encourages bacterial uptake of soluble phosphate and incorporation into biomass, thereby decreasing the level of phosphate in the wastewater. At least a portion of the sludge, including suspended solids from the final settling zone 330, are introduced, via conduits 332 and 334', into an anoxic/anaerobic zone 400 (which incorporates and retains the characteristics of the anoxic/anaerobic zone of the embodiments of FIGS. 11-15). Hence, suspended solids from final settling zone 330, are recycled back to the mainstream flow (main aerobic biological oxidation zone 310, conduit 312, aerobic/mixing zone 320, conduit 322, final settling zone 330) via solids conduits 332 and 334', anoxic/aerobic zone 400 and liquid conduit 402 and 312, anoxic zone 315 so as to facilitate the process and confer the benefits of the present invention. In addition, anoxic/anaerobic zone 400 has an additional function in phosphorus removal. In all other respects, the embodiment of FIG. 31 corresponds to that of FIG. 28; the embodiment of FIG. 32 to that of FIG. 29 and the embodiment of FIG. 33 to that of FIG. 30. The advantage of the embodiments of FIGS. 31-33 is that, owing to the series staging of zones to which no oxygen is added—anoxic/anaerobic zone 400 and anoxic zone 315—sequential phosphate release steps are provided, resulting in a greater phosphate uptake and incorporation to biomass in the subsequent aerobic step—aerobic/mixing zone 320. In addition sequential nitrate reduction also will result.

EXAMPLES

Example 1

Comparison of Trickling Filter Effluent Treatment Process

In order to examine the effectiveness of the aerobic/mixing step and anoxic/anaerobic conditions on the trickling filter effluent treatment, trickling filter effluent were subjected to three different operational conditions:

1 Trickling Filter (TF)+Settling Tank (ST);

2 TF+Aerobic/Mixing Contact Tank (AMT)+ST, and

3 TF+AMT+ST+anoxic/anaerobic treatment of return sludge.

All three flowsheets have a sludge return pump to route the settled sludge from the settling tank to any location in the trickling filter effluent process.

Figure 2A:
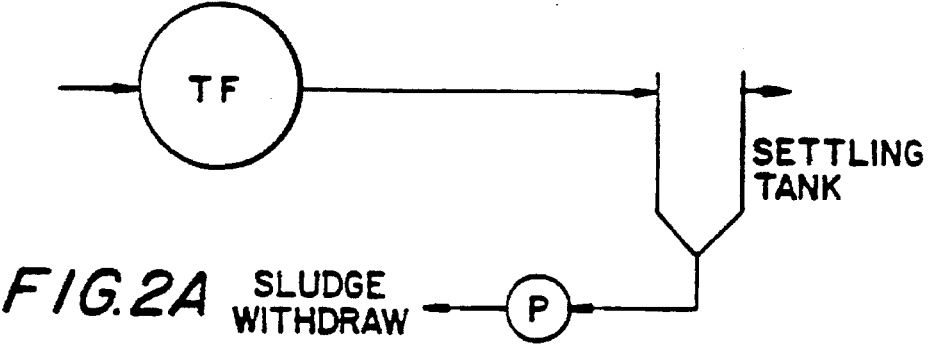
FIG. 2 is a schematic diagram of three alternative trickling filter effluent treatment processes including that of the invention.
Figure 2B:
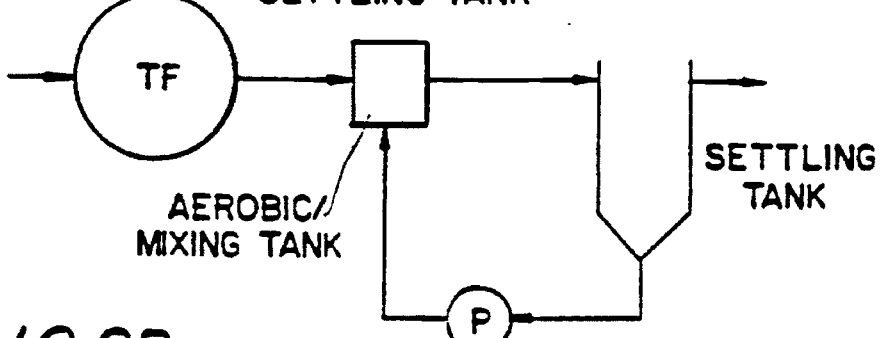
Figure 2C:
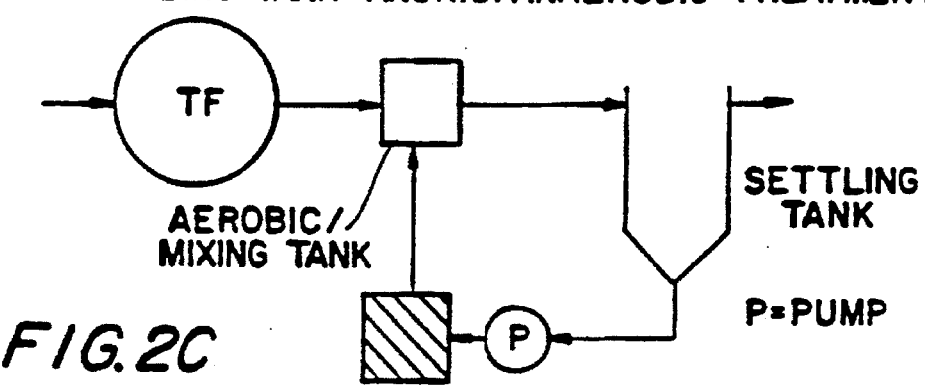

Trickling filter units and settling tanks used throughout the experiment had an identical size and dimension. Schematic diagrams of the trickling effluent treatment processes are illustrated in FIG. 2.

Equipment and Process Conditions

Figure 3:
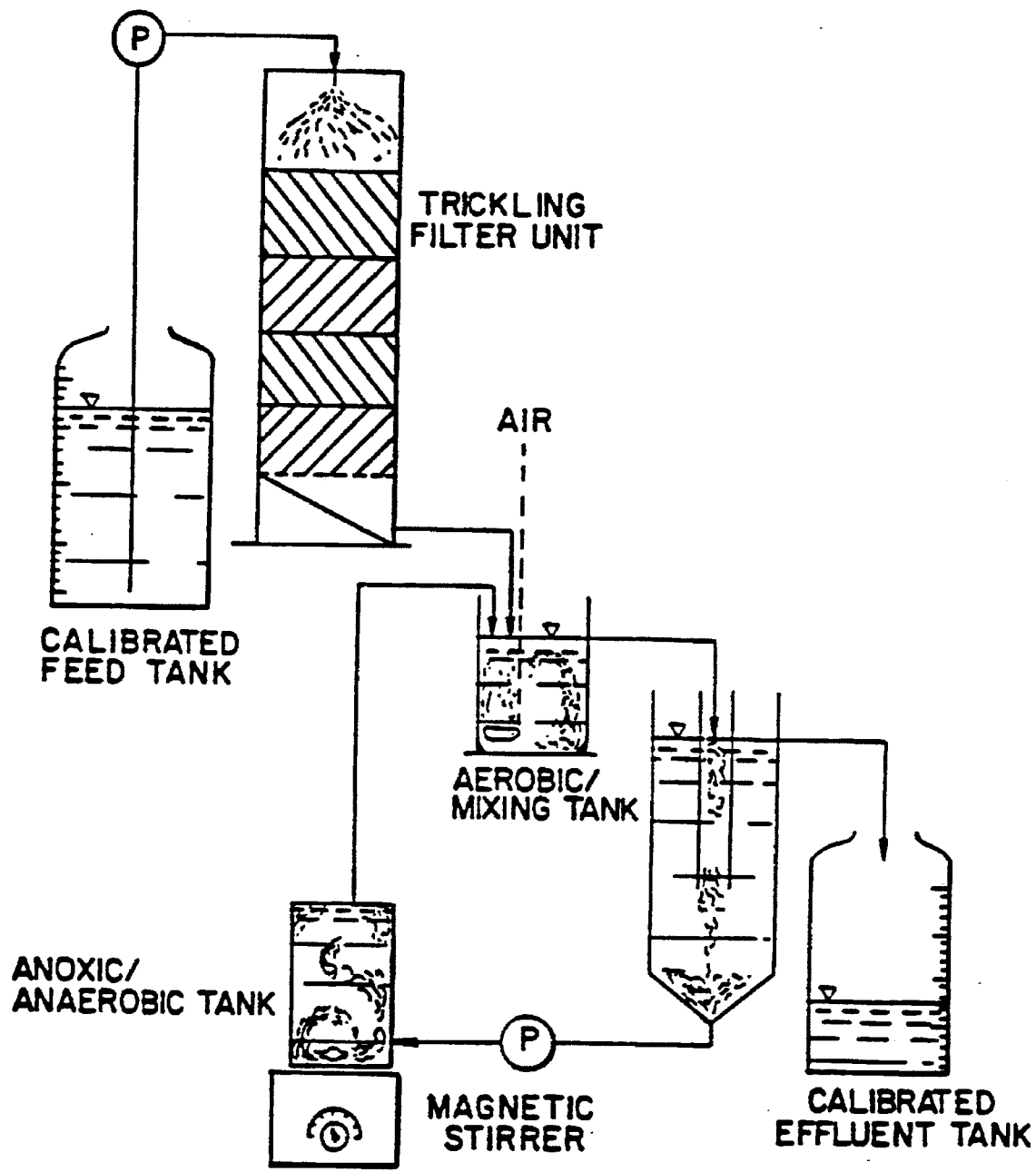
FIG. 3 is a schematic diagram of a laboratory flow scheme for investigating the trickling filter effluent treatment process of the invention.
Figure 4:
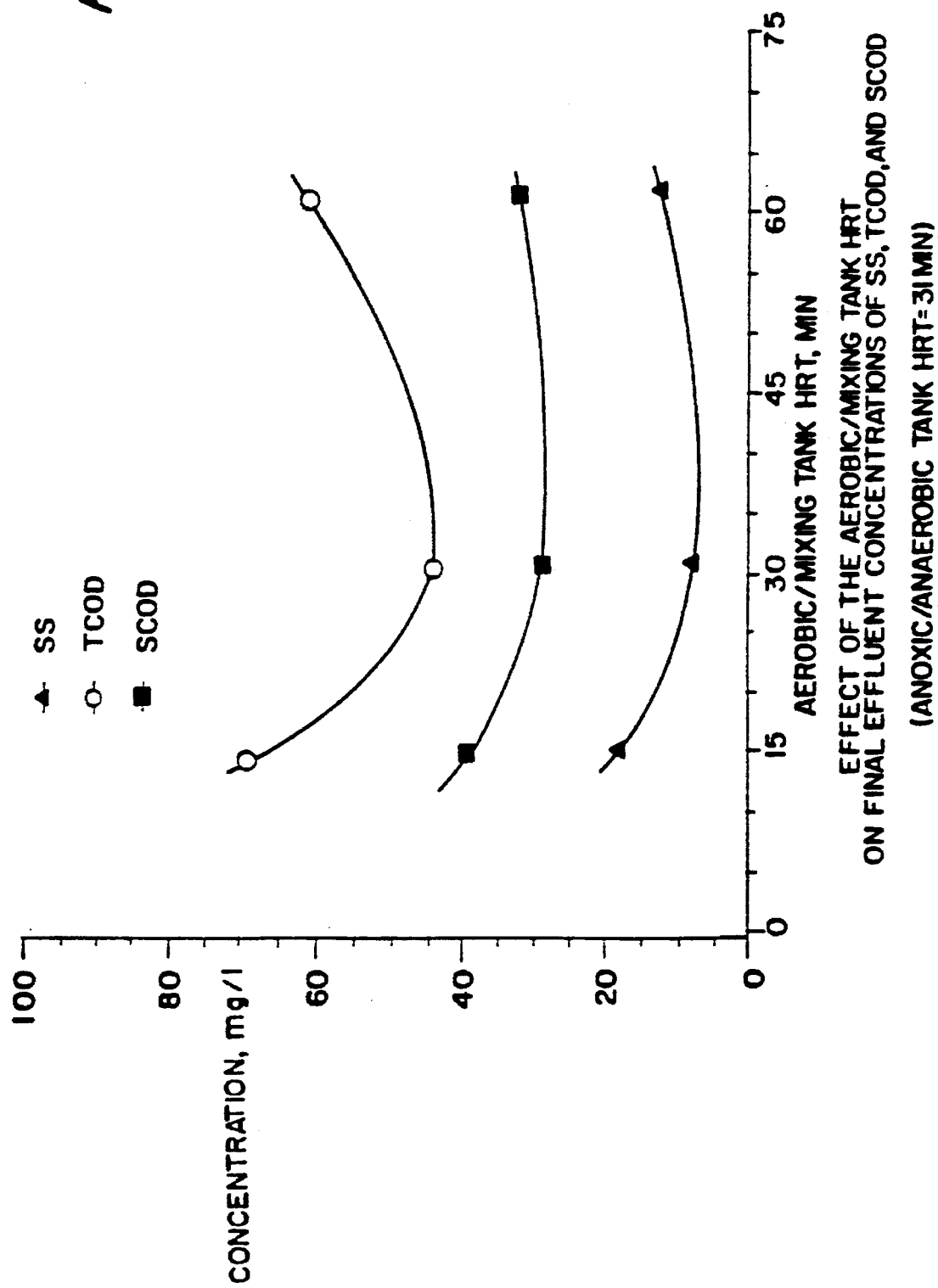
FIG. 4 is a graph of the effect of aerobic/mixing tank HRT on final effluent concentrations of SS, TCOD, and SCOD.

Three identical 1.2 meter (4') high trickling filter units were constructed. FIG. 3 shows the experimental equipment and Table 3 shows the detailed dimensions of the trickling filter unit. The influent wastewater was added to the top of the trickling filter. No effluent flow was recycled. Uniform distribution of feed flow was achieved by installing a flow distributor 15 cm above the media surface. The flow distributor was made of fine mesh nylon screen (0.16 cm or $\frac{1}{16}$" opening). Because of the 30 cm of head between the influent inlet and flow distributor, wastewater droplets were impinged at the flow distributor resulting in an even spreading of fine droplets over the cross section of media surface. The flow distributor required cleaning every three days of operation due to an excessive slime growth on the distributor which reduced the effectiveness of even flow distribution. Another feature of the trickling filter unit was the use of fine mesh screen (0.03 cm or $\frac{1}{32}$" opening) on the top and bottom of the filter which became necessary after a fly infestation. The screen provided ventilation while preventing the intrusion of flies.

TABLE 3

| Trickling Filter | Media Height | 4 ft (1.22 M) |
|---|---|---|
| | Media Cross Section | 3.0" × 6.0" (0.076 M × 0.102 M) |
| | Total Media Volume | 0.5 ft³ (0.0142 M³) |
| | Filter Body Construction | ⅜" Acrylic Plates |
| Filter Media | Media Type | Cross Flow PVC Media (BIOdek B 27060) |
| | Specific Surface Area | 30 ft²/1 ft³ of Media (100 M²/M³) |
| | Void Ratio | >95% |
| | Weight | 2 lb/1 ft³ (17 Kg/M³) |
| | Manufacturer | Munters Corp. |

The enhanced settling properties of the sludge and the kinetics of the treatment steps were investigated in a laboratory flow scheme. The unit included a calibrated feed tank containing the synthetic wastewater for the system and a trickling filter unit. Trickling filter effluent that contains unmetabolized substrates and slough-off biomass is mixed with recycled sludge from an anoxic/anaerobic tank in an aerobic/mixing zone. A settling tank receives the effluent from the aerobic/mixing tank. The supernatant or treated wastewater is collected in the calibrated final effluent reservoir. The settled sludge from the settling tank passes to the anoxic/anaerobic tank.

The anoxic/anaerobic tanks were made of ¼" (0.635 cm) thick clear acrylic plates. Aeration and complete mixing in the aerobic/mixing tank were achieved by an air pump (15 W capacity) and a diffuser stone.

An anoxic/anaerobic process condition was provided by installing the anoxic/anaerobic tank which was made of a 7.62 cm or 3 inch (ID) clear acrylic cylinder. A ¾ inch (1.5 cm) magnetic bar was placed inside the tank to provide a complete mixing condition. A ⅝ inch (1.6 cm) thick acrylic plate at the bottom of the anoxic/anaerobic tank shielded excess heat from the magnetic stirrer. Two platinum electrodes were inserted on top of the reactor to measure the electrode potential level in the tank.

The settling tank was made of a 10.2 cm or 4 inch (ID) clear acrylic cylinder and a plastic cone was attached on the bottom. A gravity flow scheme was applied in lab units from wastewater inlet to effluent outlet except wastewater feeding and sludge return from the settling tank which were accomplished by multichannel Masterflex pumps (Cole Parmer Model 7567).

The reference organic loadings were based on the plant scale data by Norris and co-workers [1, 2] which showed a maximum loading of 35 lbs $BOD_5$ and SS of less than 10 mg/l. In this study, flow rates of the laboratory trickling filters were maintained to provide the equivalent organic loading of 0.66 Kg COD/d/m3 ($BOD_5$ approximate basis of 0.46 Kg $BOD_5$/d/m$^3$) and hydraulic loading rate of 50 gpd/ft$^2$ (2 m$^3$/d/m$^2$).

Hydraulic retention time (HRT) in the aerobic/mixing tank in units 2 and 3 was maintained initially at 15 minutes, and 15 minutes of HRT were provided to the anoxic/anaerobic tank in unit 3. The feed to the aerobic/mixing tank was one unit of trickling filter effluent mixed with one unit of anoxic/anaerobic tank effluent. Performance of the three units was compared based on the steady state operation data collected over the one-month period.

Steady State Sampling and Experimental Periods

Influent wastewater samples were taken from the calibrated feed tank and trickling filter effluent samples were freshly collected from the trickling filter effluent outlet for analysis. Sludge samples were taken from the aerobic/mixing tank for SVI, ECP, and DO uptake tests. Immediately after the SVI and oxygen uptake rate measurement, the sludges were returned to the system.

Wastewater

A soluble synthetic substrate feed was adopted. The composition of the soluble synthetic wastewater which simulates the composition of domestic wastewater is presented in Table 3. The organic composition of this substrate was used by Symons et al. [13] for the laboratory activated sludge and adopted by Weng and Molor [14] for laboratory fixed-film study as a convenient and easy-to-use formulation approximately representative of the fat, carbohydrate, and protein concentration of domestic sewage. The protein is present as nutrient broth representing 65% of the chemical oxygen demand (COD), the carbohydrate is present as glucose, representing 25% of the COD, and the fatty acid is present as sodium oleate representing 10% of the COD.

TABLE 4

Synthetic Sewage Substrate [14]

| Chemicals | Amount |
|---|---|
| Nutrient Broth** | 9.0 g |
| Glucose | 3.789 g |
| Sodium Oleate | 0.603 g |
| $NH_4Cl$ | 2.538 g |
| $(NH_4)_2SO_4$ | 0.264 g |
| $CaCl_2.H_2O$ | 0.294 g |
| $MgCl_2.6H_2O$ | 0.407 g |
| $CaSO_4.H_2O$ | 1.350 g |
| $MgSO_4.H_2O$ | 3.650 g |
| $Na_3PO_4.12H_2O$ | 3.650 g |
| $KH_2PO_4$ | 6.434 g |
| $K_2HPO_4$ | 6.430 g |

TABLE 4-continued

Synthetic Sewage Substrate [14]

| Chemicals | Amount |
|---|---|
| $Na_2HPO_4.7H_2O$ | 1.500 g |
| Trace Salts Solution*** | 16.66 ml |
| COD | 360. mg/1* |

*Dilute to 45 l with tape water. COD can be varied with the dilution ratio of tap water and chemical amount.
**Bio-Cert Nutrient Broth, Fisher Scientific Co.
***Dilute 5 g of $FeCl_3$—$6H_2O$, 0.672 g of $AlCl_3$—$6H_2O$, 0.342 g of $CoCl_2$—$6H_2O$, 0.5 g of $MnSo_4$-$H_2O$, 0.06 g of $(NH_4)_6$—$Mo_7O_{24}$—$4H_2O$ and 0.01 g of $ZnCl_2$—$H_2O$ to 1 l with distilled water.

Analytical Methods

COD of the samples was measured by closed reflux colorimetric method according to the Standard Methods [15]. However, samples for COD at low levels were back titrated with standard ferrous ammonium sulfate solution with the ferroin indicator.

SS concentration in the samples was measured according to Standard Methods [15]. Whatman grade 934AH glass filters which had 47 mm diameter and nominal pore size of 1.2 μM were used. The Drying oven (Precision Scientific, Model 18) maintained the temperature of 103° C. (±1° C.). Volatile suspended solids (VSS) was measured by using a muffle furnace (Thermolyne Model F-A1738, Cybron Corp.) at 550° C. A gravitational analysis was performed by laboratory balance (Mettler Model Type 15).

The analytical method to determine the ECP content in the anoxic/anaerobic sludge sample has been subject to intensive research [16,17,18] and various modifications have been developed [5,6,7,8,9,10,11,12,16,17]. The analytical measurement of the extracellular polymeric materials from the sludge sample was performed based on the gravitational measurement of the solvent insoluble biological polymers after a centrifugation and ultrasonic treatment of sludge. The testing technique is described as follows Forty ml of the sludge sample are taken from each reactor and carefully placed in IEC centrifugation tubes (50) ml capacity) using a wide mouth pipette. The sample tubes are placed in a high speed centrifuge (ICE) Model HT) and centrifuged 15 minutes at 2700G. The supernatant is carefully discarded from the tubes and remaining solids are resuspended with distilled water to 40 ml. The resuspended sludges are carefully transferred to 100 ml glass beakers and the sludge is sonicated with an ultrasonicator (Heat System-Ultrasonic Inc., Model W200) at 20E output power rating for 10 minutes. A drop of the sonicated sludge is removed from the beaker to examine the viability of microorganisms using a microscope. Immediately after the microscope examination, the sludge is transferred to centrifugal tubes and centrifuged for 10 more minutes at 7000G. The sludges are carefully transferred to 250 ml Erlenmeyer flasks and 80 ml of acetone and ethyl alcohol mixture (1:1) is added. The flasks are thoroughly mixed. The caps are tightened and the flasks are placed in a 5° C. refrigerator overnight. After the refrigeration, the insoluble precipitates are filtered through a glass fiber filter (Whatman AH937), 47 mm diameter) and the filter paper is placed in an aluminum tin and covered with a Petri dish. This is dried at 80° C. for 1 hour in a drying oven (Precision Scientific, Model 18). (During the drying step in the 80° C. convection oven, the filter paper must be placed inside a Petri dish to prevent possible loss of ECP due to hot air convection.) The solvent insoluble extracellular polymer (ECP) that is trapped in the glass fiber filter is analyzed by an analytical balance (Mettler, Model Type 15).

The sludge volume index (SVI) is the volume in ml occupied by 1 g of suspension after 30 minutes settling. Due to the limited sample volume, the SVI test was performed by using a 100 ml graduated cylinder (Kimax grand, Fisher Cat. #08-554E). The SVI data taken from 100 ml cylinder is slightly higher than that of the standard SVI test using a 1 l graduated cylinder.

The BOD test procedure used was that recommended by *Standard Methods* [15]. Each BOD test was performed with a nitrification inhibitor and the glucose-glutamic acid solution as a reference standard.

Start-up Operation

To initiate biofilm growth on the filter media, an activated sludge seed sample was taken from the Rockland County, New York Wastewater Treatment Plant, mixed with the synthetic wastewater and fed to the laboratory trickling filters. The biofilm was yellow to light brown. Initial influent COD and flow rate were kept at approximately 200 mg/l and 20 lpd, respectively. The media surfaces in the trickling filters were eventually covered with dark brown biofilm during 4 weeks of operation. The influent COD concentration and flow rate were increased to 400 mg/l and 24 lpd, respectively, for the steady state operation as described previously. The microscopic examination of trickling filter effluent using 100 magnification indicated that protozoa (free swimming ciliates and stalked ciliates) as well as some filamentous microorganisms were present. The trickling filter effluent was subject to various treatment conditions as described in the experimental procedures.

Comparison of Trickling Filter Effluent Treatment Processes

The schematic flow diagrams for units 1, 2, and 3 are illustrated in FIG. 2. The laboratory unit 1 represented a single stage trickling filter system and ran as a control unit. An aerobic/mixing tank was added to the trickling in laboratory unit 2 to simulate a Trickling Filter/Solids Contact process. An anoxic/anaerobic tank in addition to the aerobic/mixing tank was included in the laboratory unit 3 to examine the effect of anoxic/anaerobic conditions in the trickling filter effluent treatment.

Throughout the experiment, the hydraulic loading rates were kept at 40.2 to 41.2 gpd/ft$^2$ (2.03 to 2.05 m$_3$/d/m$_2$) by adjusting flow rates to 23.6 to 23.9 lpd (6.2 to 6.3 gpd). Influent COD to the trickling filter was initially kept at approximately 200 mg/l for the acclimation but was increased to the approximately 400 mg/l range for the normal operation. Thus, organic loadings of the tickling filters during the steady state operation were in the range of 0.44 to 0.46 kg COD/d/m$_3$ (49.8 to 50.4 lb COD/d/1000 ft$_3$). The hydraulic retention time (HRT) in the aerobic/mixing tanks in units 2 and 3 was maintained at 15 minutes, and HRT in the anoxic/anaerobic tank in unit 3 was also 15 minutes. Detailed operational conditions are summarized in Table 5.

TABLE 5

Operational Conditions of Trickling Filter Effluent Treatment Experiment

|  | Unit 1<br>TF + ST | Unit 2<br>TF + AMT + ST | Unit 3<br>TF + AMT + AT + ST |
| --- | --- | --- | --- |
| operating temp. °C. | 25.29 | 25.29 | 25.29 |
| avg. flow rate liter/<br>day (gpd) | 23.85<br>(6.30) | 23.55<br>(6.22) | 23.73<br>(6.27) |

TABLE 5-continued

Operational Conditions of Trickling Filter Effluent Treatment Experiment

|  | Unit 1<br>TF + ST | Unit 2<br>TF + AMT + ST | Unit 3<br>TF + AMT + AT + ST |
| --- | --- | --- | --- |
| avg. daily organic<br>loading, m$^3$/d/m$^2$<br>(lb COD/d/1000 cuft) | 0.660<br>(41.19) | 0.652<br>(40.67) | 0.657<br>(40.98) |
| avg. daily hydraulic<br>loading, m$^3$/d/m$^2$<br>(gpd/sqft)<br>aerobic/mixing tank | 2.054<br>(50.41) | 2.028<br>(49.78) | 2.044<br>(50.16) |
| vol, ml | N/A | 250 | 250 |
| HRT, min.<br>anoxic/anaerobic tank | N/A | 15.3 | 15.2 |
| vol, ml | N/A | N/A | 250 |
| HRT, min. | N/A | N/A | 15.2 |

TF = trickling filter
ST = settling tank
AMT = aerobic/mixing tank
AT = anoxic/anaerobic tank The experimental results obtained from the trickling filter effluent treatment processes are summarized in Table 6. Each listed value represents the mean of 7 experimental data points.

TABLE 6

Operational Results of the Trickling Filter Effluent Treatment Experiment

|  | Unit 1 | Unit 2 | Unit 3 |
| --- | --- | --- | --- |
| aerobic/mixing tank<br>HRT, min. | N/A | 15.3 | 15.2 |
| anoxic/anaerobic tank<br>HRT, min. | N/A | N/A | 15.2 |
| influent COD, mg/l<br>trickling filter<br>effluent | 392.0 | 392.0 | 392.0 |
| SS, mg/l | 79.9 | 90.0 | 94.6 |
| TCOD, mg/l | 177.4 | 208.1 | 208.0 |
| SCOD, mg/l<br>final effluent | 83.2 | 87.7 | 82.5 |
| SS, mg/l | 24.3 | 9.74 | 7.07 |
| TCOD, mg/l | 92.6 | 55.8 | 30.1 |
| SCOD, mg/l | 66.0 | 38.7 | 22.1 |
| SVI, ml/g | N/A | 82.5 | 78.5 |

N/A = not available

The soluble COD (SCOD) concentration in the trickling filter effluents remained consistently in the range of 83 to 88 mg/l, indicating that the soluble organic removal rates of the three trickling filter units were comparable. However, total COD (TCOD) and SS concentrations in the trickling filter effluents varied from 177 to 208 mg/l, and 80 to 95 mg/l, respectively. The variation of trickling filter effluent SS and TCOD indicates that rates of biofilm slough-off in the three trickling filter units were at different levels under the identical trickling filter operational conditions. The results also suggest that the final settling tank in the trickling filter plant could receive a varying solids loading under the same organic and hydraulic loading condition. Therefore, the successful operation of final settling tanks in trickling filter plants would depend on good flocculating sludge as well as proper settling tank design to offset the fluctuation of solids loading under the normal operating condition.

SCOD and SS removal efficiencies of the three different effluent treatment processes were calculated and are shown in Table 7.

TABLE 7

% COD and % SS Removal Efficiencies
At Various Effluent Treatment Conditions

|  | Unit 1 TF + SF | Unit 2 TF + AMT + ST | Unit 3 TF + AMT + AT + ST |
|---|---|---|---|
| TF Inf. COD, mg/l | 392.0 | 392.0 | 392.0 |
| TF Eff. SCOD, mg/l | 83.2 | 87.6 | 82.5 |
| % SCOD removal at TF plant | 78.8 | 77.6 | 79.0 |
| final Eff. SCOD mg/l | 66.0 | 38.7 | 22.1 |
| % SCOD removal during TF effluent treatment | 20.7 | 55.9 | 73.2 |
| total % SCOD removal | 83.2 | 90.1 | 94.4 |
| TF eff. SS, mg/l | 79.9 | 90.0 | 94.6 |
| final eff. SS, mg/l | 24.3 | 9.74 | 7.07 |
| total % SS removal during TF effluent treatment | 69.9 | 89.2 | 92.5 |

TF = trickling filter
ST = settling tank
AMT = aerobic/mixing tank
AT = anoxic/anaerobic tank The trickling filters have a similar SCOD removal efficiency in the 83 to 88% range. However, the SCOD removal efficiency of the three effluent treatment methods were markedly different. For example, the control unit 1 which has the settling tank as the only effluent treatment, shows only 20.7% of SCOD removal which is calculated on a trickling filter effluent basis (83.2 mg/l was reduced to 66.0 mg/l). Conversely, approximately 21% of unmetabolized organics in the trickling filter effluent is reduced by microorganisms during the settling periods.

However, SCOD removal efficiency during the aeration step in laboratory unit 2 was at 55.9% on a trickling filter effluent SCOD basis. An additional 35% of SCOD in the trickling filter effluent was reduced by the 15 minute aeration over and above the 21% of trickling filter effluent SCOD removed by the settling tank.

SCOD removal during the aeration step with an anoxic/anaerobic treatment was a superior 73.2% on a trickling filter effluent basis. Addition of an anoxic/anaerobic treatment step in unit 3 reduced SCOD an additional 17% compared to unit 2. The results demonstrate that SCOD in the trickling filter effluent was reduced by the sludge developed during the 15 minutes of anoxic/anaerobic treatment step in addition to the aerobic/mixing step.

The positive effect of anoxic/anaerobic treatment is also seen in the removal efficiency of SS. SS removal efficiency during the settling step in the laboratory unit 1 was 69.9% at a final effluent SS of 24.3 mg/l. This barely meets the secondary treatment limitation of 30 mg/l. Units 2 and 3 showed 89.2% and 2.5% SS removal, respectively, indicating that these trickling filter effluent treatment processes produce a much lower SS than the secondary treatment standard of 30 mg/l. SS removal of the unit with an aerobic/mixing step and the anoxic/anaerobic treatment showed the best performance, indicating that the additional anoxic/anaerobic treatment was more effective in reducing SS together with organic removal.

The aerobic/mixing step in units 2 and 3 also positively affected the microbiological quality of the final effluent. During the experiment, the surface of the settling tank in unit 1 showed some fungi and water mold growth. However, settling tanks in the treatment units 2 and 3 showed a brown color and protozoa (stalked ciliates and free swimming ciliates) and high levels of animal species (nematodes). In contrast, settled sludge in the control unit 1 showed a dark brown to black color and microbial species were not as abundant in sludges from units 2 and 3.

The phosphate ($PO_4$-P) levels in the trickling filter effluent anoxic/anaerobic sludge and final effluent were measured from a filtered sample. The 45 minutes of HRT in the anoxic/anaerobic tank released up to 10.6 mg/l of $PO_4$-P. The released $PO_4$-P was then taken up by the sludge in the aerobic/mixing tank (30 minutes of HRT) and final effluent data showed 11.1 mg/l of $PO_4$-P removed during the effluent treatment process. During the effluent treatment step, 75 mg/l of SCOD ($SBOD_5$ basis of 54 mg/l) was removed. Therefore, the metabolic requirement of phosphorus was less than 2 mg/l, indicating that in excess of 8 mg/l of $PO_4$-P was removed during the effluent treatment step.

Example 2

A wastewater treatment process wax set up in accordance with the flowsheet of FIG. 18. The main aerobic biological oxidation zone was a single stage, laboratory (0.5 ft diameter) rotating biological contactor (RBC). The RBC was followed by an anoxic tank, an aerobic/mixing tank and a final settling tank. Clarified liquid was discharged from the final settling tank and suspended solids that settled in the final settling tank were recycled back to the anoxic tank. Sodium acetate was the sole source of volatile acid and was added to the anoxic tank.

The hydraulic detention time in the anoxic tank was 6.7 minutes; that in the aerobic/mixing tank was 30 minutes and that in the final settling tank was 72 minutes. The seed sludge for the research was obtained from an operating AO nutrient removal wastewater treatment plant in Warminster, Pa. The recirculation rate of the final settling tank solids back to the anoxic tank was set at 2 times the wastewater feed so that the settling level in the laboratory scale final settling tank could be maintained at a low level.

The addition of the sodium acetate was set at a 50 mg/l level in the anoxic tank. The sodium acetate at this level provided for both phosphate release and nitrate reduction. The phosphate released was subsequently removed in the aerobic/mixing tank.

The experimental results are shown in Table 8. The % Red. results are based on the main aerobic biological oxidation unit effluent concentrations.

TABLE 8

| Parameter | Influent (mg/l) | Main Aerobic Biological Oxidation Unit Effluent (mg/l) | Anoxic Tank (mg/l) | Aerobic/ Mixing Tank (mg/l) | Final Settling Tank (mg/l) | % Red. |
|---|---|---|---|---|---|---|
| $PO_4$—P | 6.1 | 6.2 | 25.8 | 0.1 | 0.2 | 98.4* |
| $NO_3$—N | 11.5** | 14 | 0.3 | 0.7 | 0.82 | 94.1 |
| $NH_3$—N | 3.4 | 5.2 | 1.2 | <0.1 | <0.1 | >98.1 |
| $NO_2$—N | — | 2.0 | ND | ND | ND | — |
| Total Inorganic Nitrogen | 14.9 | 21.2 | 1.5 | <0.8 | <0.92 | >95.7 |

*Based on aerobic/mixing tank effluent. If based on final settling tank effluent, then efficiency would be 96.8%
**Added as $NaNO_3$
ND Non-detectable References 1. Norris, D. P., Parker, D. P., Daniels, M. L., and Owens, E. L. 1980. Efficiencies of advanced waste treatment obtained with upgraded trickling filters. *Civil Engineering-ASCE,* 48:96–101.
2. Norris, D. P., Parker, D. P., Daniels, M. L., and Owens, E. L. 1982. High quality trickling filter effluent without tertiary treatment. *J. Wat. Poll Cont. Fed.,* 54:1087–98.
3. Fedotoff, R. C. 1983. The trickling filter finds new partner. *Water Engineering & Management,* June:28.
4. Niku, S., et al. 1982. Reliability and stability of trickling filter process. *J. Wat. Poll. Cont. Fed.,* 54: 129–34.
5. Forster, C. F. 1971. Separation of activated sludge using natural and synthetic polymers. *Water Pollution Control,* 71:363–71.
6. Wilkinson, J. F. 1958. The extracellular polysaccharides of bacteria. *Bacteriol. Rev.,* 22:46.
7. Tenny, M. W., and Stumm, W. 1965. Chemical flocculation of microorganisms in biological waste treatment. *J. Wat. Poll. Cont. Fed.,* 37:1370–88.
8. Gulas, V., Bond, M., and L. Benefield 1979. Use of exocellular polymers for thickening and dewatering activated sludge. *J. Wat. Poll. Cont. Fed.,* 51:798–807.
9. Pavoni, J., Tenny, M., and Echelberger, Jr., W. 1972. Bacterial exocellular polymers and biological flocculation. *J. Wat. Poll. Cont. Fed.,* 44:414–31.
10. Friedman, B., et al. 1970. Structure of exocellular polymers and their relationships to bacteria/flocculation. *J. Bacteriol.,* 98:1328–88.
11. Kiff, R. J. 1978. A study of the factors affecting bioflocculation in the activated sludge process. *Water Pollution Control,* 77:464–70.
12. Harris, R. H., and Mitchell, R. 1975. Inhibition of the bioflocculation of bacteria by biopolymers. *Water Research,* 9:993–99.
13. Symons, J., McKinney, R., and Hassis, H. 1960. A procedure for determination of the biological treatability of industrial wastes. *J. Wat. Poll. Cont. Fed.,* 32:841–52.
14. Weng, C., and Molof, A. H. 1974. Nitrification in the biological fixed-fdm rotating disk system. *J. Wat. Poll. Cont. Fed.,* 46:1676.
15. *Standard Methods.* 1985. 15th ed. APHA-AWWA-WPCF.
16. Geher, R., and Henry, J. G. 1983. Removal of extracellular materials: techniques and pitfalls. *Water Research,* 17:1743–48.
17. Novak, J. E., and Haugan, B. E. 1981. Polymer extraction from activated sludge. *J. Wat. Poll. Cont. Fed.,* 53:1420–24.
18. Brown, M. J., and Lester, J. N. 1980. Comparison of extracellular polymer extraction methods. *Appli. & Environ. Microbiol.,* 40:179–86.
19. Fuchs G. W. and M. Chen, 1975. Microbial Basis for Phosphate Removal in the Activated Sludge Process for the Treatment of Wastewater. *Microb. Ecol.,* 2:119.
20. Venter, S. L. V. et al. 1978. Optimization of Johannesburg Olifantsvlei Extended Aeration Plant for Phosphorus Removal. *Prog. in Wat. Technology* 10:279.
21. Nichols, H. A. and D. W. Osborn 1979. Bacterial Stress: Prerequisite for Biological Removal of Phosphorus. JWPCF 51(3):557, 1979.
22. Barnard, J. L., 1984. Activated Primary Tanks for Phosphate Removal. Water SA, 10(3): July 1984.

We claim:

1. A wastewater treatment process providing increased nitrogen, phosphate and biochemical oxygen demand removal comprising the steps of:
   (a) passing wastewater containing ammonia nitrogen, phosphate and biochemical oxygen demand through a main aerobic biological oxidation zone and therein oxidizing at least a portion of the ammonia nitrogen to nitrate nitrogen and at least a portion of the biochemical oxygen demand and converting at least a portion of the biochemical oxygen demand into suspended solids;
   (b) passing (i) effluent from the main aerobic biological oxidation zone and (ii) effluent from the anoxic/anaerobic zone of step (e) to a zone to which no additional oxygen is added and therein reducing a portion of the ammonia and nitrate nitrogen to molecular nitrogen;
   (c) passing effluent from the zone of step (b) to an aerobic/mixing zone wherein the effluent is mixed under aerobic conditions and molecular nitrogen is removed from the effluent and phosphate is removed;
   (d) passing effluent from the aerobic/mixing zone to a final settling zone and therein separating
      (i) a purified wastewater having decreased biochemical oxygen demand and a decreased phosphate and nitrogen content and
      (ii) a final sludge containing suspended solids and phosphate;
   (e) recycling at least a portion of the final sludge to an anoxic/anaerobic zone and adding at least one volatile acid to the said anoxic/anaerobic zone to release phosphate; and
   (f) passing effluent from the anoxic/anaerobic zone to the zone of step (b).

2. A wastewater treatment process as recited in claim 1 wherein primary sludge obtained from a primary settling zone which proceeds said main aerobic biological oxidation zone and/or final sludge obtained from said final settling zone are fermented to produce volatile acid and a portion of the product of fermentation containing volatile acid is passed to said anoxic/anaerobic zone.

3. A wastewater treatment process as recited in claim 2, wherein the primary sludge is fermented in a primary sludge fermentation zone and the final sludge is fermented in a final sludge fermentation zone.

4. A wastewater treatment process as recited in claim 3, wherein the zone to which no additional oxygen is added is an anoxic zone.

5. A wastewater treatment process as recited in claim 3, wherein the zone to which no additional oxygen is added is an anaerobic zone.

6. A wastewater treatment process as recited in claim 5, wherein a portion of the product of said primary sludge fermentation zone is passed to said anaerobic zone.

7. A wastewater treatment process as recited in claim 1, wherein the volatile acid is also added to the zone to which no additional oxygen is added.

8. A wastewater treatment process as recited in claim 1, wherein said zone to which no additional oxygen is added is an anoxic zone.

9. A wastewater treatment process as recited in claim 1, wherein the wastewater introduced into said main aerobic biological oxidation zone is first passed through a primary settling zone to remove primary sludge, said primary sludge is fermented to produce volatile acid in a primary sludge fermentation and a first portion of said primary sludge fermentation zone containing volatile acid is added to the anoxic/anaerobic zone.

10. A wastewater treatment process as recited in claim 9, wherein the zone to which no additional oxygen is added is an anoxic zone.

11. A wastewater treatment process as recited in claim 9, wherein the zone to which no additional oxygen is present added is anaerobic zone.

12. A wastewater treatment process as recited in claim 11, wherein a second portion of said primary sludge fermentation zone is passed to said anaerobic zone.

13. A wastewater treatment process as recited in claim 1, wherein a portion of the final sludge containing suspended solids and phosphate is fermented in a final sludge fermentation zone and a first portion of the product of the final sludge fermentation zone is passed to said anoxic/anaerobic zone.

14. A wastewater treatment process as recited in claim 13, wherein the zone to which no additional oxygen is added is an anoxic zone.

15. A wastewater treatment process as recited in claim 13, wherein the zone to which no additional oxygen is added is an anaerobic zone.

16. A wastewater treatment process as recited in claim 15, wherein a second portion of said product of said final fermentation zone is passed to said anaerobic zone.

17. A wastewater treatment process providing increased nitrogen, phosphate and biochemical oxygen demand removal comprising the steps of:
    (a) passing waste water containing ammonia nitrogen, phosphate and biochemical oxygen demand through a main aerobic biological oxidation zone and therein oxidizing a portion of the ammonia nitrogen to nitrate nitrogen and at least a portion of the biochemical oxygen demand and converting at least a portion of the biochemical oxygen demand into suspended solids;
    (b) passing (i) effluent from the main aerobic biological oxidation zone, and (ii) recycle sludge from the anoxic/anaerobic zone of step (e) to an anaerobic zone and treating it therein;
    (c) passing the effluent from said anaerobic zone to an aerobic/mixing zone and mixing it therein under aerobic conditions;
    (d) passing effluent from the aerobic/mixing zone to a final settling zone and therein separating
        (i) a purified wastewater having decreased biochemical oxygen demand and a decreased phosphate and nitrogen content and
        (ii) a final sludge containing suspended solids and phosphate;
    (e) recycling at least a portion of the final sludge to an anoxic/anaerobic zone and treating it therein with at least one volatile acid to release phosphates; and
    (f) passing effluent from the anoxic/anaerobic zone to the anaerobic zone.

18. A wastewater treatment process as recited in claim 17 wherein the main aerobic biological oxidation zone is preceded by a primary settling step and wherein a portion of the primary sludge formed in said primary settling zone is fermented and a portion of the fermentation products thereof is passed to the said anaerobic zone and/or to said anoxic/anaerobic zone.

19. A wastewater treatment process as recited in claim 17 wherein a portion of the sludge obtained in the final settling zone is passed to a final sludge fermentation zone to produce fermented final sludge and a portion of the fermented final sludge from said final sludge fermentation zone is passed to said anaerobic zone and/or to said anoxic/anaerobic zone.

20. A wastewater treatment process providing increased nitrogen, phosphate and biochemical oxygen demand removal comprising the steps of:
    (a) passing wastewater containing ammonia nitrogen, phosphate and biochemical oxygen demand through a main aerobic biological oxidation zone and therein oxidizing at least a portion of the ammonia nitrogen to nitrate nitrogen and at least a portion of the biochemical oxygen demand and converting at least a portion of the biochemical oxygen demand into suspended solids;
    (b) passing (i) effluent from the main aerobic biological oxidation zone, and (ii) effluent from the anoxic/anaerobic zone of step (f) into an anoxic zone and therein reducing at least a portion of the ammonia and nitrate nitrogen to molecular nitrogen;
    (c) passing effluent from said anoxic zone to an anaerobic zone together with a volatile acid and thereby releasing phosphate;
    (d) passing effluent from the anaerobic zone of step (c) to an aerobic/mixing zone wherein the effluent is mixed under aerobic conditions and molecular nitrogen and phosphate are removed;
    (e) passing effluent from the aerobic/mixing zone to a final settling zone and therein separating (i) purified wastewater having decreased biochemical oxygen demand and a decreased phosphate and nitrogen content, and (ii) a final sludge containing suspended solids;
    (f) recycling at least a portion of the final sludge to an anoxic/anaerobic zone; and
    (g) recycling effluent from said anoxic/anaerobic zone to said anoxic zone and/or to said anaerobic zone.

21. A wastewater treatment process as recited in claim 20 wherein the main aerobic biological oxidation zone is preceded by a primary settling zone and the primary sludge obtained therefrom is fermented in a primary sludge fermentation zone and a product of said primary sludge fermentation zone is introduced into said anaerobic zone and/or said anoxic/anaerobic zone.

22. A wastewater treatment process as recited in claim 20 wherein a portion of the final sludge is passed to a final sludge fermentation zone and a product of said final sludge fermentation zone is introduced into said anaerobic zone and/or said anoxic/anaerobic zone.

23. A wastewater treatment process as recited in claim 20, wherein the wastewater introduced into said main aerobic biological oxidation zone is first passed through a primary settling zone to remove primary sludge, said primary sludge is fermented in a primary sludge fermentation zone to produce volatile acid and a first portion of said primary fermentation zone containing volatile acid is added to said anaerobic zone and a second portion of said primary sludge fermentation zone is added to said anoxic/anaerobic zone.

24. A wastewater treatment process as recited in claim 23, wherein a portion of the final sludge containing suspended solids and phosphate is fermented in a final sludge fermentation zone and a portion of the product of said final sludge fermentation zone containing volatile acid is introduced into said anoxic/anaerobic zone and/or said anaerobic zone.

25. A wastewater treatment process as recited in claim 20, wherein a portion of the final sludge is passed to a final sludge fermentation zone and a product of said final sludge fermentation zone is introduced into said anaerobic zone and/or said anoxic/anaerobic zone and/or anoxic zone.

26. A wastewater treatment process as recited in claim 20, wherein the volatile acid is sodium acetate.

* * * * *